US007378971B2

(12) United States Patent
Andrechak et al.

(10) Patent No.: US 7,378,971 B2
(45) Date of Patent: May 27, 2008

(54) RADIO FREQUENCY IDENTIFICATION TAGS FOR DIGITAL STORAGE DISCS

(75) Inventors: Gary Andrechak, South San Francisco, CA (US); Martin Weilmeier, Westbank (CA)

(73) Assignee: Hitachi America, Ltd., Brisbane, CA (US)

( * ) Notice: Subject to any disclaimer, the term of this patent is extended or adjusted under 35 U.S.C. 154(b) by 219 days.

(21) Appl. No.: 11/240,202

(22) Filed: Sep. 30, 2005

(65) Prior Publication Data

US 2006/0077062 A1   Apr. 13, 2006

Related U.S. Application Data

(60) Provisional application No. 60/615,491, filed on Oct. 1, 2004.

(51) Int. Cl.
  *G08B 13/14* (2006.01)
  *G11B 3/70* (2006.01)
  *G11B 5/84* (2006.01)

(52) U.S. Cl. .................................. 340/572.7; 369/273

(58) Field of Classification Search .. 340/568.1–572.9; 705/16–29; 365/1–244; 369/1–292; 343/701–916, 343/700 MS
See application file for complete search history.

(56) References Cited

U.S. PATENT DOCUMENTS

| 6,947,371 | B2 * | 9/2005 | Bigley | 369/290.1 |
|---|---|---|---|---|
| 7,275,040 | B2 * | 9/2007 | Forster et al. | 705/18 |
| 7,292,147 | B2 * | 11/2007 | Benedikt | 340/572.7 |
| 2002/0175818 | A1 * | 11/2002 | King et al. | 340/572.8 |
| 2003/0216969 | A1 | 11/2003 | Bauer et al. | |
| 2004/0052202 | A1 | 3/2004 | Brollier | |
| 2004/0255317 | A1 * | 12/2004 | Benedikt et al. | 720/718 |
| 2005/0174240 | A1 * | 8/2005 | Vogt | 340/572.8 |
| 2006/0028344 | A1 * | 2/2006 | Forster | 340/572.7 |
| 2006/0071795 | A1 * | 4/2006 | Benedikt | 340/572.7 |

* cited by examiner

*Primary Examiner*—Benjamin C. Lee
*Assistant Examiner*—Jennifer Mehmood
(74) *Attorney, Agent, or Firm*—Straub & Pokotylo; Michael P. Straub

(57) ABSTRACT

A universal low cost radio frequency identification (RFID) tag for use with data storage discs includes an RFID chip, e.g., 2.45 GHz mu-RFID chip, coupled to a linear dipole antenna. The antenna length is reduced in length from the expected length for an optimally tuned antenna corresponding to the operating radio frequency of the RFID chip in a free space environment. The antenna is placed in the tag such as to substantially overlap disc hub area and not extend into data area. The combination of the shortened linear dipole antenna and metallization on the disc to which the tag is applied effectively form a complex antenna operational in the RFID chip's frequency range. The RFID tag works on CDs and DVDs with and without substantially metallized hub areas. The RFID tag is less 0.3 mm thick and may include: ring shape, adhesive material, spacing material achieving uniform thickness, a counterbalance provision.

23 Claims, 14 Drawing Sheets

RADIO FREQUENCY IDENTIFICATION TAGS FOR DIGITAL STORAGE DISCS

RELATED APPLICATIONS

The present application claims the benefit of U.S. Provisional Patent Application 60/615,491 filed Oct. 1, 2004 which is hereby expressly incorporated by reference.

FIELD OF THE INVENTION

The present invention relates generally to the field of identification tags and, more particularly, to the field of radio frequency identification tags for data digital storage discs such as, e.g., digital video discs.

BACKGROUND OF THE INVENTION

Radio Frequency identification (RFID) tags are increasingly being used to track multiple objects throughout a specified system. For example, RFID tags are being used on warehouse pallets to track the location of goods in a warehouse or verify the authenticity of tickets at a venue.

An RFID tag is often implemented as a tiny integrated chip (IC) (hereinafter "mu-chip") attached to an antenna. The IC stores a small amount of data, such as an. ID number, and the antenna is used to communicate with a reader. For example, one particular existing Hitachi mu-chip stores 128 bits of read-only data and communicates using a frequency of 2.45 GHz. Tags can be either active, which means they contain a battery, or passive. In the case of passive tags an external source, e.g., the tag reader, provides the power needed for communication. In many applications, direct line of sight is not necessary to read a tag; tag reading can be accomplished provided the RF signal is strong enough to go between the tag and reader. With some readers and tags it is also possible to read multiple tags simultaneously. RFID tags are designed to work at specific radio frequencies depending upon the physical characteristics of the antenna. Higher frequencies enable faster communication and typically larger read ranges. Lower frequencies often work better in the vicinity of metals or liquids. In general, the most suitable tag design depends on the specific application.

RFID tags can be very small which enables a number of different applications. For example, a Hitachi mu-chip can be applied to paper currency to combat counterfeit bills. This is possible because of the small size of the mu-chip; some embodiments of a mu-chip transponder measure 0.4 mm square and 0.15 mm thick.

One example of an existing RFID tag is a Hitachi mu-chip coupled to an antenna. Hitachi's mu-chip aids upwards communication from real-world objects to virtual ones. The RFID mu-chip 100, as shown in functional circuit blocks in FIG. 1, is 0.06-mm thick and 0.4-mm long on each side. The RFID mu-chip 100 includes an analog circuit 102 and a digital circuit 104. The analog circuit 102 includes a power rectifier module 106, a power-on reset module 108, and a clock extraction module 110. The digital circuit 104 includes a 10-bit counter 112, a decoder 114, and a 128-bit ROM 116. The analog circuit 102 is coupled to the digital circuit 104. The analog circuit 102 is also coupled to antenna terminals 118 and 120. By applying suitable packaging techniques, manufacturers can embed mu-chips in micro-objects. The 2.45 GHz band frequency, used for radio communication signaling between the mu-chip and a sensor, similar to that used by Bluetooth technology, enables use of a small sensor device.

The current mu-chip function is to return the 128-bit identification data stored in 128 bit ROM 116 upon receiving the radio wave from an external sensor. This data is the same length as IPv6 addresses. The mu-chip's characteristics give it an advantage in certain applications over other approaches to identifying and tracking products.

The mu-chip is similar to the bar code in that both give identification numbers to objects. One major difference is that mu-chips can be attached to smaller objects than a bar code can be attached to, because a bar code has a larger surface area than a mu-chip. Therefore, the mu-chip enables handling of objects efficiently in a wider range of applications than the bar code. Furthermore, copying mu-chips is much more difficult than copying bar codes. Thus, mu-chips can handle objects more securely than bar codes, preventing the forgery of security papers and providing counterfeit protection for branded products.

Current mu-chips retain 128-bit ID information in ROM 116, which is written only once at manufacturing time. The 128-bit ID information in ROM 116 cannot be modified after shipment.

FIG. 2 shows an example of the basic structure of mu-chip operations in a block diagram 200. Diagram 200 illustrates mu-chip 202 embedded in product 204. Mu-chip 202 may be mu-chip 100 of FIG. 1. The mu-chip 202 includes an amplifier 206 and a ROM 208 including system/application data and an ID code. An antenna 210 is also embedded in the product 204, and the antenna 210 is coupled to the mu-chip 202.

One counter-measure is to embed a mu-chip into security papers or brand name products and verify authenticity with a sensor reading. In this case, a tag reader including a transmitter and a read sensor 212, transmits signals to the mu-chip 202, e.g., using a 2.45 GHz microwave carrier, which is used to power on and activate the mu-chip 202. This results in the mu-chip 202 transmitting its stored 128-bit ID information via antenna 210. The sensor 212 receives and reads the return data, recovering the 128-bit ID information which has been sent via microwaves 214. With the antenna 210, the mu-chip is readable by the sensor 212 within a 30-cm range, instead of proximate range for reading a mu-chip 202 that is applicable when antenna 210 is not used. The output from the sensor 212 is sent to terminal 216. The output from terminal 216 is then sent to a server 218 which processes the data. The server 218 is part of a control center 220. In both cases, the security audit mechanism implemented in a server 218 checks for any abnormality by analyzing network-transmitted records. The system signals an alarm when it detects an alleged counterfeit chip, identification numbers transmitted at the same time from different locations, or any other predefined abnormality.

One design uses a built-in 100-pf capacitor formed by the gate oxide of the MOS transistor as a power supply, eliminating the need for batteries. The minimum operating voltage of the chip's digital chips is 0.5V. This chip has attached to it a thin-film external antenna. The chip terminals (118, 120) are connected to the antenna by an anisotropic conductive film (ACF). This type of structure results in a 0.15 mm thin transponder. The maximum communication distance between the mu-chip and a reader is expected to be 300 mm at a reader power of 300 mW. The RFID tag includes the mu-chip circuit and antenna.

The mu-chip 100 is one example of a RFID circuit, and other types of chip circuits and antennas are also available.

One potential application for RFID tags is for use with discs including Digital Versatile Discs (DVDs) and/or Compact Discs (CDs). Previously, attaching RFID tags to Digital Versatile Discs (DVDs) and Compact Discs (CDs) has been attempted. The term disc is intended to be used here interchangeably with the term disk which is also used sometimes. The physical characteristics of DVDs and CDs have precluded previous attempts to find a solution which works with a wide variety of such discs in a cost effective manner. The area of the disc which could be used to contain a RFID tag is limited because most of the disc surface needs to be accessible to the disc reader mechanism in order for the disc to function. In fact, the only consistently available space on almost all disc designs on which to put an RFID tag is the hub area, e.g., the 40 mm diameter hub present in many disc designs. Since the hub area is reserved for the clamping mechanism, it is universally available regardless of the specific disc type and whether the data surface is only on one side or is on two sides.

The data area of DVD's and CD's comprises a thin sputtered metallization film to permit reading by the laser mechanism. Historically, this metallization covered the entire data area, but did not extend beyond it. Specifically, the hub area at the center of the disc, that contains no data, had typically not been metallized. The metallization formed an annulus from the outside of the hub to the outside of the disc, even though the printing on single-sided discs may have extended across the entire surface. These types of discs, with no metallization in the hub area, provide less obstacles to RFID tagging than discs with metallization on the hub.

Recently DVD manufacturers have begun creating discs where the metallization extends into the hub area, almost to the center hole. Essentially the metallization is an annulus with a smaller inner diameter and the same outer diameter as regular DVD's. One reason for the increased metallization is for aesthetic purposes. These classes of discs can be described as metallized hub discs, and an increasing number of movie studio titles are delivered on these discs. Some CDs may also use a metallized hub.

FIG. 3 shows an example of a metallized hub disc 300. Disc 300 may be a DVD or CD Disc. Disc 300 includes a metallized sputtering data area 302 forming an outer ring, a metallized sputtering hub area 304 forming an intermediate ring, and a clear inner rim 306 forming an inner ring. FIG. 4 shows an example of a disc 400 with a non-metallized hub. Disc 400 may be a DVD or CD Disc. Disc 400 includes a metallized sputtering data area 402 forming an outer ring, a hub area 404 with no metallized sputtering forming an intermediate ring, and a clear inner rim 406 forming an inner ring.

A technical problem with metallized hub discs for RFID tagging is that the metallization extends into the hub area where if the RFID label is attached, the metallization effectively prevents the tag from operating. Tags that might work well, from a communications standpoint, on non-metallized hub discs do not function on the metallized hub disc variety, making universal application very difficult.

It would be advantageous if RFID tags could be developed that can inexpensively and/or reliably overcome the functional inoperability associated with radio frequency identification (RFID) tags when attached to discs that have metallization sputtering in the disc hub area, e.g., to within 4 mm of the center hole of the disc. It would also be beneficial to have RFID tags that could be universally used on a wide range of disc types, e.g., CDs, DVDs, one sided, two sided, with and without metallized hub area and future formats.

RFID tag use and problems pertinent to disc applications will be further discussed. DVD and CD item level disc inventory applications abound. Public and private libraries and disc rental enterprises could benefit from RFID tags. A potential benefit over other inventory and tracking methods such as bar codes is that RFID tags facilitate non-line of site tag reading capability, e.g., speeding processing of a disc. In addition by tagging individual discs with RFID tags, rather than tagging disc carriers such as jewel cases, as is typically the practice with bar codes applied to disc carriers, the reliability of the tracking is improved. These benefits of RFID disc tagging can also provide cost reductions, e.g., as manual labor operations are reduced and time associated with correcting errors such as a mismatched bar coded sleeve with a disc is reduced. Most current applications of RFID to optical discs involve tagging the disc carrier. Discrepancies can be expected when the carrier and the disc title inside the carrier are inconsistent, either by accident or fraud. Tagging the disc itself is the one solution to passively and positively identify a disc.

Thus, it should be appreciated that there is a need to be able to universally and reliably tag and read most or all DVDs and CDs that have both metallized and non-metallized hub areas at a price point that is generally valuable to the end user community from both the tag and the tag tracking application deployment perspectives. Typically, large scale inventories of discs will include discs of both hub types. It is also possible that clear and metallized hub discs may be used interchangeably on an identical disc title during different manufacturing batches. A key market driver to the adoption of an RFID tag to discs is likely to be that the RFID tag be capable of universal application to most or all possible existing and future discs and the universal RFID tag function acceptably on most or all possible existing discs.

A universal tag design would afford production scale efficiencies that tend to bring large volume tag unit manufacturing costs down. The universal tag design facilitates ease of deployment of the tags on discs because one design fits most or all disc types. In such a design implementation of a RFID tag, no special segregation of discs or special processing by type of disc would required during the application of tags to the discs since such an RFID tag would be functionally operational with discs containing either metallized or non-metallized hubs.

Some prior technology issues and problems will now be discussed. CDs and DVDs are typically made of polycarbonate plastic with a layer of aluminum sputtering. This metallic layer electromagnetically couples to the RFID antenna and affects radio frequency transmissions, often reducing and sometimes completely impairing tag interrogation effectiveness and read reliability. Prior technologies at lower radio frequencies are not effective at overcoming read reliability difficulties associated with discs possessing a metallized hub.

13.56 MHz RFID tags are less susceptible to the interference interaction of the metal in the disc than are lower radio frequency RFID tags, but these tags are not immune to this interference problem. One known example is a specialized booster antenna label that works in conjunction with a circular coil 13.56 MHz RFID tag placed in the disc's clear hub. The booster label amplifies the RF signal of the hub tag by means of an auxiliary RF antenna that is placed over the disc's outer edge. The clear plastic overlay therefore covers the entire surface of the disc adding weight and cost. The booster disc labeling system may not work with metallized hub tags and is priced at a high level relative to the disc price. This price point is only effective in tracking the most valuable of disc inventories, and this technology is not usable with double-sided discs.

915 MHz RFID tags can be designed to effectively function on clear hub discs. However, this tag's functioning would be impaired on metallized hub discs. The hub metallization will interfere with the tag's performance by adversely interacting with the RFID antenna. If 915 MHz tags are used with metallized hub discs, additional design solutions will likely be needed adding cost, weight and/or thickness to the resulting tag design. Therefore, designing a single 915 MHz tag that is readable with both a metallized hub and clear hub disc is expected to be extremely difficult, if not impossible.

Various prior technologies utilizing tags designed for the 2.45 GHz frequency are rather costly. In addition, many 2.45 GHz tags are produced on heavy chip board stock and are too thick and heavy to apply to discs.

The existing solutions use rather large and thick-sized integrated chip (IC) chips which negatively affect the production cost of the RFID tag. The thicker IC chip may fail or disconnect from its antenna if positioned under or close to a disc drive internal clamping mechanism. Discs need to spin at very high speeds. Additional unbalanced weight on a disc can negatively affect the viability of a tag's use on a disc. Unbalanced weight will induce wobble on the spinning disc. Accordingly, any appreciable additional weight could affect the functioning of a disc drive. Standards for disc characteristics are very specific. Motors and other parts inside disc drives are built around these standards. The addition of an RFID tag on a disc changes the physical characteristics of the disc which may negatively affect some makes of drives, particularly if the tag is heavy. Lastly, overall tag thickness can adversely affect performance of the disc drive clamping mechanisms if the thick tag is placed in the disc hub area. Insecurely clamping a disc could result in an inability to read the disc or damage to the clamping mechanism, the disc, the RFID tag or the optical drive.

In view of the above, there is a need for new RFID tag designs which could be used to tag discs. It would be advantageous if such a new RFID disc tag was universally applicable to both CDs and DVDs, one and two sided, with and without metallized hub. It would also be beneficial if such a new RFID disc tag could be read from either side of the disc. Since physical characteristics of an RFID tag to be applied to a disc are a significant consideration, it would be useful if a new RFID disc tag incorporated features directed at addressing at least some these design goals: minimalization of tag weight, minimalization of tag thickness, minimalization of tag size, control of weight imbalance, damage resistance to hub clamping pressure.

Since cost is also a significant consideration in a deployment system, it would be beneficial if a new RFID disc tag could be usable with existing tag reader system equipment currently available. To benefit from the cost advantages of large scale production, it would be beneficial if a new RFID disc tag, or at least a portion of the tag, was similar to a currently produced widely used RFID tag.

SUMMARY OF THE INVENTION

The present invention is directed to radio frequency identification (RFID) tags suitable for use on digital data storage discs, e.g., CDs and DVDs. Various RFID tags, in accordance with the present invention, include a RFID micro-chip coupled to a linear dipole antenna, with the linear dipole antenna being shorter in length than the optimal dipole antenna length associated with the RFID chip operating frequency, e.g., 2.45 GHz, in a free space environment. By using this shortened linear dipole antenna length, the shortened dipole antenna does not extend into the data region of the disc and does not interfere with normal disc data operations. In some embodiments, the ends of the linear dipole antenna are tapered to account for curvature of the edge of the hub area/data area interface. In addition by using a shortened linear dipole antenna, one can benefit from the advantages of scale, e.g., by adapting widely used mass produced currently available RFID tags using linear dipole antenna, such as the Hitachi mu-chip tag, e.g., by clipping the ends of the antenna and repackaging. Some RFID tags in accordance with the present invention utilize the metallization areas of the disc, e.g., a metallized hub area, to couple, e.g., through capacitance coupling, to the short length dipole antenna thus providing a complex antenna suitable for the operating frequency range of the RFID chip.

RFID disc tags, in accordance with the invention, are installed on a disc in the hub area, and are universally applicable to a wide range of disc applications including CDs, DVDs, HD DVD and Blu-Ray discs, with and without metallized hub areas. This universality of the RFID tag of the present invention, in addition to its low cost, makes the RFID tag of the present invention advantageous over other known custom RFID tag designs directed to a particular type of disc. For example, many of these known RFID tag designs tend to be higher in cost, e.g., due to a complex antenna design and/or due to low production, and work with one type of disc, e.g., a non-metallized hub disc, but do not typically work with metallized hub discs.

Most digital data storage discs include a clear inner rim of the disc, and at least a portion of the linear dipole antenna of the RFID tag, implemented in accordance with the present invention, is situated such as to be located within that portion of the disc, thus facilitating tag reader capability from both sides of the disc. On discs, wherein the disc metallization is approximately equidistance from each disc surface, the RFID is applied on either side. On discs, where the metallization is situated near one of the surfaces, the tag is typically applied to the opposite side, e.g., such as in the case of a metallized hub area CD. In various embodiments, the RFID tag in accordance with the present invention is applied to the disc such that the antenna is at least 0.4 mm away from the metallization layer.

In various embodiments, an RFID tag in accordance with the present invention, includes adhesive material allowing the tag to be affixed to the disc. In some embodiments, the RFID tag includes a ring, e.g., a paper ring, for affixing the tag to the hub area of a disc. Some embodiments incorporate a peel off label into the RFID tag. In some embodiments, structural filler is included as part of the RFID tag so as to achieve substantially uniform thickness of the RFID tag and/or to prevent damage from crushing via clamping the RFID tag. In various embodiments, the RFID tag includes a circular overlay body which fits over the RFID chip. In some embodiments, the RFID chip/antenna in accordance with the invention, being very lightweight, adds insignificant weight to the disc from the perspective of disc imbalance at expected disc operating speeds, and additional counterbalance is not necessary. In various embodiments, one or more counterbalances is included in the tag to counterbalance the weight of the RFID microchip and linear dipole antenna. In some embodiments, one or more notches in the tag are provided to counterbalance the weight of the RFID microchip and linear dipole antenna.

In some embodiments, the RFID tag uses a predefined frequency range which is greater than 2 GHz, e.g., a frequency range that is within 2.25 to 2.75 GHz. For example some embodiments use a frequency range centered on 2.45

GHz. In some embodiments, the RFID tag is less than 0.3 mm thick, e.g., approximately 0.25 mm thick. In some embodiments, the RFID tag linear dipole antenna has a length of approximately 37 mm. In various embodiments, the linear dipole antenna is straight along its longest axis having a maximum length along its longest axis within the range of 34 mm to 40 mm. In other embodiments of the RFID tag of the present invention, the linear dipole antenna has curved ends along its longest axis, and the dipole antenna has a minimum length along its longest axis within the range of 34 mm to 38 mm and a maximum length along its longest axis less than 50 mm.

In various embodiments, the RFID tag of the present invention has a linear dipole antenna length which has been reduced by at least 25% with respect to the optimal length that would typically be used with the RFID chip in a free space environment. In some such embodiments, the RFID tag of the present invention has a linear dipole antenna length which has been reduced by more than 25%, e.g., at least 30% with respect to the optimal length that would typically be used with the RFID chip in a free space environment.

The percent reduction in antenna size may depend on the frequency range and can be different for tags designed to work at different frequency ranges, e.g., 3 GHz, 4 GHz, or 5 GHz tags. In some embodiments, there is no reduction in antenna size or even an increase in antenna length at higher frequencies.

The invention is directed in some embodiments to the combination of an RFID tag, implemented in accordance with the present invention, and a disc, e.g., a CD, DVD, Blu-Ray disc, or HDVD disc. In some such embodiments, an RFID tag of the present invention is applied to the disc, e.g., by a disc user or user management facility, e.g., as part of a library disc management process. In other embodiments, an RFID tag of the present invention is applied to the disc by a disc manufacturer or a service provider, e.g., a disc content writing facility or a disc rental facility. In some embodiments, an RFID tag of the present invention is embedded in the disc as part of the manufacturing process, e.g., with the RFID micro-chip and linear dipole antenna of short length being embedded in the disc.

Numerous additional features, benefits and embodiments are discussed in the detailed description which follows.

DETAILED DESCRIPTION

Figure 6:
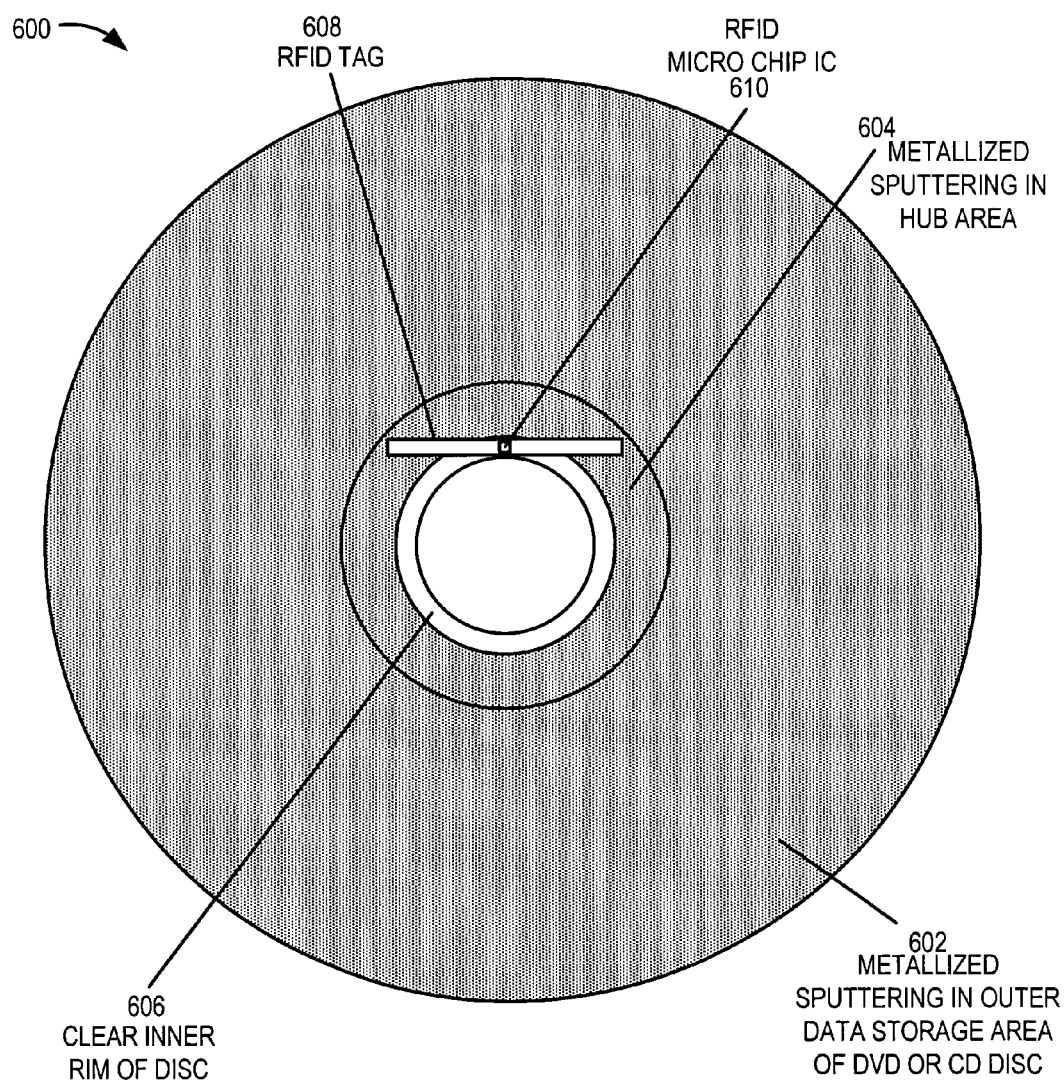
FIG. 6 is a drawing illustrating a DVD or CD disc including metallized sputtering in the hub area and including an RFID tag in accordance with the present invention.
Figure 7:
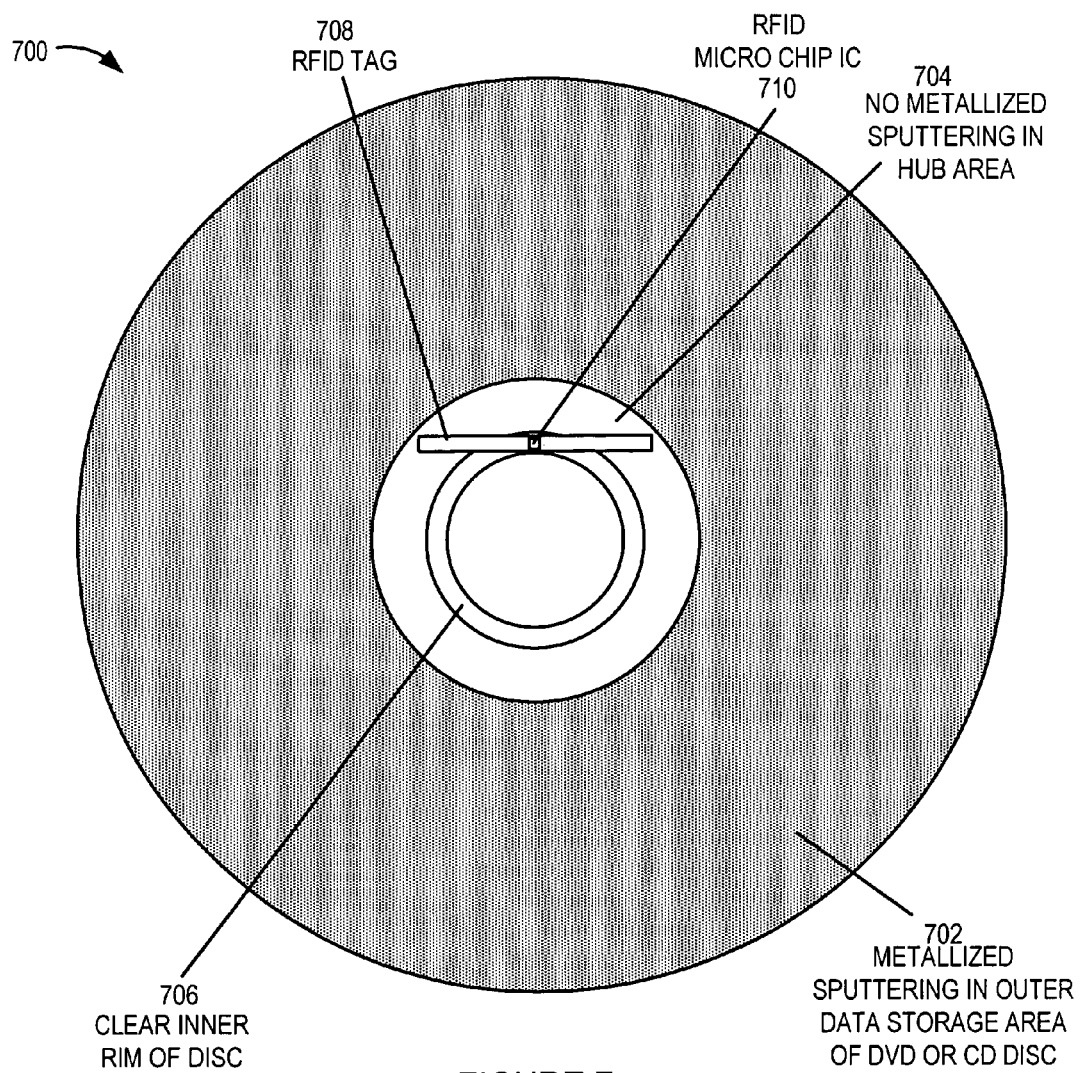
FIG. 7 is a drawing illustrating a DVD or CD disc including no metallized sputtering in the hub area and including an RFID tag in accordance with the present invention.

In order to overcome one or more of the obstacles of prior RFID systems, in some embodiments of the present invention, an existing RFID tag including a linear dipole antenna tuned to the RF carrier frequency is modified prior to use by preferably trimming equal lengths of the antenna at both ends so that the tag fits within the hub area of both a CD or a DVD without extending into the data area. In some embodiments of the present invention, an RFID in accordance with the present invention is manufactured such that the linear dipole antenna has a detuned antenna, with the manufactured antenna length being shorter than the length that would be selected to achieve optimal tuning for the operational frequency when operating in a free space environment, the tag length being such that the tag fits within the hub area of both a CD or a DVD without extending into the data area. In some such configurations, the RFID tag is positioned tangential to the central hole with the chip centered at the hole and the antenna extending equal lengths to the edge of the hub. FIG. 6 and FIG. 7 are examples of such embodiments. In some embodiments, a circular adhesive label the diameter of the hub or smaller holds the RFID tag in place and provides a consistent surface for the clamping mechanism. With the clear hub discs this results in the ends of the antenna coming in close proximity to the metallization, while the bulk of the antenna and the chip remain in the non-metallized hub area. With metallized hub discs, there is an increased area of overlap between the RFID antenna and the hub metallization.

For example, in the case of an embodiment using a mu-chip, such as those available by Hitachi, the standard linear tag antenna is intentionally detuned away from 2.45 GHz by trimming away an equal length of antenna from both ends of the tag to fit entirely within the hub area of a DVD and CD. The optimal 53 mm (milli-meter) mu-chip antenna for working with a 2.45 GHz reader, in a free space environment, is reduced to a length of preferably 37 mm. This detuned tag antenna electromagnetically couples to the metallization sputtering on the disc to read effectively. Together, the detuned antenna and the disc metallization form a new complex antenna that is readable at 2.45 GHz, even though the individual detuned tag by itself is unreadable in free space.

With non-metallized hub discs, the read range of a modified mu-chip tag on a disc increases (relative to an optimal tag in free space) in the direction perpendicular to the disc. The shortened RFID antenna and disc metallization form a combined antenna system (called an "effective antenna") that has greater read range perpendicular to the disc surface. The disc metallization favorably modifies the antenna characteristics of the RFID antenna.

With metallized hub discs, the hub metallization overlaps with most of the remaining RFID antenna. This effectively shields the RFID antenna and reduces read range. With 2.45 GHz mu-chips, however, the tag is still readable perpendicular to the disc even though almost the entire length of antenna overlaps with the hub metallization. Furthermore, the mu-chip tag is readable from both sides of the disc.

The mu-chip tag is 0.25 mm thick at its highest point, where the chip in located on the tag. The addition of an adhesive substrate will add additional minimal thickness depending on the substrate. This thickness is much thinner and lighter in weight than other RFID tag designs commercially available.

There are at least two elements that help contribute to the modified tag of the invention working with metallized hub discs: 1) the gap between the hub metallization and the attached antenna, and 2) the high frequency of the RFID device. DVD's are constructed with the metallization layer centered in the middle of the 1.2 mm thickness of the disc. Thus the disc metallization (including hub metallization, if any) is 0.6 mm from either surface of the disc in some implementations. In such cases, the RFID antenna will be separated by at least 0.6 mm from the metallization. For discs which have been tagged with a modified RFID tag of the present invention operating at 2.45 GHz, this gap is sufficient to retain some readability of the modified tag of the invention due to the relatively high frequency used.

The usability of the modified tags with discs has been confirmed by actual testing and implementation. When the RFID antenna is too close to a metal surface the RFID is not readable. As the gap distance between the RFID antenna and a metal surface is increased, the tag becomes readable at some reduced read range. The read range improves with increasing gap distance, but quite slowly. Thus there is typically some minimum gap distance that is required to make the tag readable, but a small increase in the gap does little to increase read range. In the case of 2.45 GHz tags, the practical gap distance can be as small as approximately 1 mm to make a full-length mu-chip tag readable on a metal surface. This gap would be larger for lower frequency tags and shorter for higher frequency tags. While the situation is somewhat more complex with DVD's since the dipole antenna is shorter than optimal and the metallization is a specific shape, the effect of the gap and the metal disc surface enables the 2.45 GHz mu-chip tag to function with metallized hub DVD's where 915 MHz and lower frequency tags will not. Conversely, higher frequency RFID tags are expected to work more efficiently in this application of the invention when they become commercially available.

CD's are manufactured differently than DVD's in that the metallization layer is on the label side of the disc rather than in the center of the disc thickness. Known commercial CD's lack hub metallization, and the modified RFID disc tags of the present invention work well with such discs. In addition should metallized hub discs be used in the future, the modified RFID tags of the present invention will work well if applied to the data-reading side of the disc rather than the label side due to the distance between the metal disc layer and the surface of the disc.

The tag of the present invention is very lightweight. In some embodiments, the RFID tag includes a circular adhesive label overlay in addition to the RFID microchip/linear dipole antenna. Disc spin wobble can, and in some embodiments is, counterbalanced with a notch cut and removal of some of the circular adhesive label overlay, e.g., in the area surrounding the portion where the RFID microchip/antenna is placed. In some embodiments, the adhesive label overlay is constructed predominately of paper. However, polymer labels can also be used. In other embodiments, rather than notch the label, a weight in the form of additional paper or some other material is included in the tag and placed to counterbalance the weight of the RFID microchip/antenna, e.g., the counterbalance weight is positioned across from the RFID microchip/antenna. In some embodiments, the tag includes an RFID microchip and linear dipole antenna which is adhesively secured to the disc. In some such embodiments, a separate counterbalance weight in the form of additional paper of some other material is placed and secured on the disc across from the tag to counterbalance the tag weight. The modified tag can be used with any DVD or CD including metallized hub DVDs. The very thin nature of the tag will not adversely affect the disc drive clamping mechanism or itself be damaged as a result of the clamping device, and in some embodiments the weight of the microchip/antenna of the RFID tag of the invention is light enough to eliminate the need for counterbalancing.

FIG. 6 shows a figure of an example of a disc 600, e.g., a CD or DVD, including an RFID tag 608, implemented in accordance with the present invention. The disc 600 includes a clear-inner rim 606, a metallized hub area 604, and a larger metallized outside data storage area 602. The RFID tag 608 includes a microchip IC 610. The RFID tag 608 is placed on the surface including the clear inner rim 606 and the metallized hub area. The exemplary RFID tag 608 has the microchip integrated circuit ("IC") located in the center of the tag.

FIG. 7 shows a figure of an example of a disc 700, e.g., a CD or DVD, including an RFID tag 708, implemented in accordance with the present invention. The disc 700 includes a clear inner rim 706, a non-metallized hub area 704, and a larger metallized outside data storage area 702. The RFID tag 708 includes a microchip IC 710. The RFID tag 708 is placed on the surface including the clear inner rim 706 and the non-metallized hub area 704. The exemplary RFID tag 708 has the microchip integrated circuit ("IC") located in the center of the tag. The exemplary RFID tag 708 may be the same type as the exemplary RFID tag 608 of FIG. 6, the type of RFID tag, being universally applicable to both discs types with and without metallized sputtering in the hub area.

Figure 8:
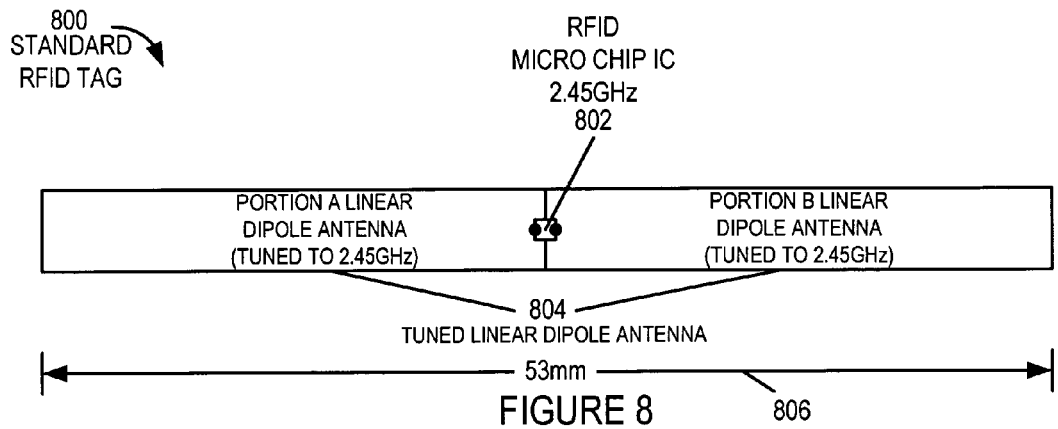
FIG. 8 is a drawing illustrating a known RFID tag including a dipole antenna with the antenna length tuned for 2.45 GHz operation in free space.

FIG. 8 is a drawing of a standard RFID tag 800, e.g., produced on a large scale for use in a wide range of applications, but unsuitable in its present form for tagging DVDs and/or CDs. Exemplary standard RFID tag 800 includes a RFID microchip IC 802 set to operate at 2.45 GHz and a tuned linear dipole antenna 804 tuned, e.g., via controlling antenna length, to match the operating frequency of 2.45 GHz. The length of a standard linear RFID tag 800, tuned to 2.45 GHZ is 53 mm 806. Each portion of the linear dipole antenna 804 (portion A, portion B) is coupled to a different antenna terminal of the micro-IC chip 802, and the two antenna portions are physically separated. If a tag of length 53 mm 806 was applied to a DVD or CD, the ends of the tag would extend into outer metallized data storage portion of the disc, thus rendering tag 800 unsuitable for universally tagging discs.

Figure 9:
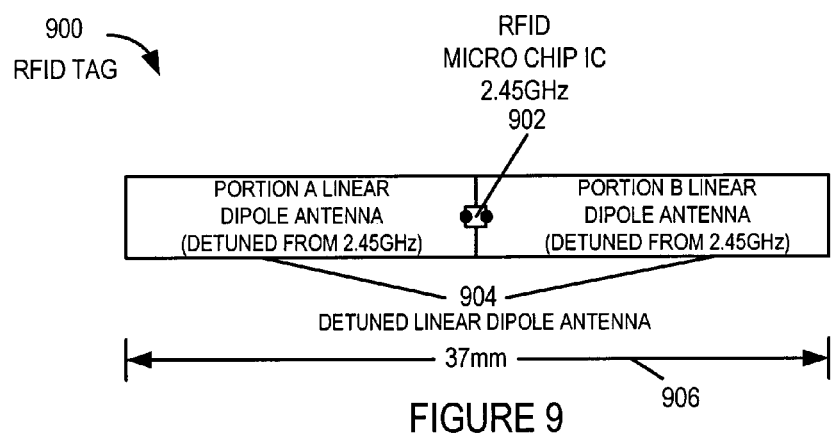
FIG. 9 is a drawing illustrating an exemplary RFID tag, implemented in accordance with the present invention, the exemplary RFID tag including a dipole antenna with a shorter length than would typically be expected to match the micro-chip operating frequency in free space.

FIG. 9 is a drawing of an exemplary RFID tag 900, implemented in accordance with the present invention. Exemplary RFID tag 900 may be implemented by modifying the standard RFID tag 800 of FIG. 8, in accordance with the invention or directly manufactured to conform with the features, e.g., length, etc., of the tag embodiment of the invention. Exemplary RFID tag 900 includes a RFID microchip IC 902 set to operate at 2.45 GHz and a de-tuned linear dipole antenna 904. In some embodiments, microchip IC 902 is the same as microchip IC 802. The antenna 904 detuning from the 2.45 GHz frequency is accomplished via shortening the antenna length from the optimally tuned free space length of 57 mm used in the standard tag 800. The length of RFID tag 900, de-tuned from 2.45 GHZ is 37 mm 906, but other lengths less than the 57 mm length are possible. The preferred length for the exemplary RFID tag 900 of the present invention for a standard or mini DVD or CD disc is 37 mm. Therefore, the decrease in the length of the standard RFID linear tag 800 is approximately 30%. If the modified tag is substantially shorter than 37 mm, then the operation of tag will be impaired for clear hub discs. If the tag is substantially longer than 37 mm, then the operation of a RFID tag on a double sided disc will impair disc function by covering the data portion of the disc. In some embodiments, the tag of the invention is at least 10% shorter than the 57 mm standard length. Tags having a length 20% to 40% shorter than the 57 mm length are used in some embodiments. Tags 25% to 35% shorter than the length of 57 mm are particularly useful. In some embodiments, the antenna of the RFID tag is a linear dipole antenna which straight along its longest axis and has a maximum length along its longest axis within the range of 34 mm to 40 mm.

Figure 10:
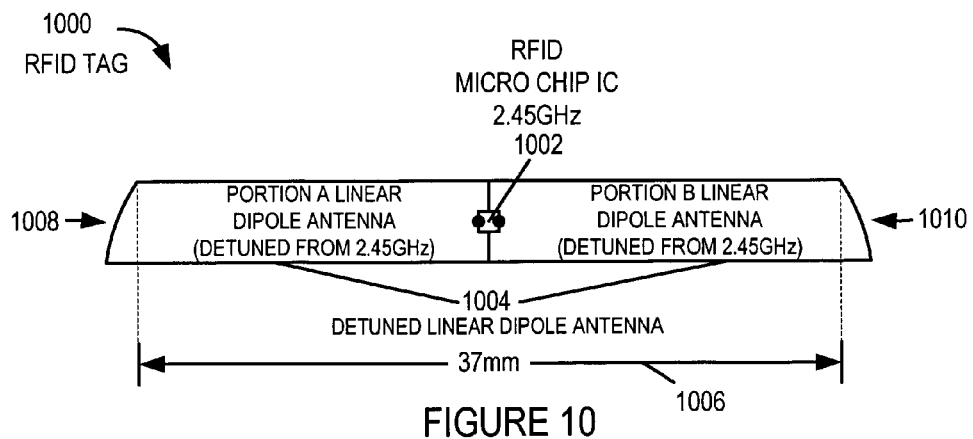
FIG. 10 is a drawing illustrating an exemplary RFID tag, implemented in accordance with the present invention, which is a variation of the FIG. 9 embodiment is which the edges of the antenna ends have been tapered.

FIG. 10 is a drawing of an exemplary RFID tag 1000, implemented in accordance with the present invention. Exemplary RFID tag 1000 includes a RFID microchip 1002 set to operate at 2.45 GHz and a de-tuned linear dipole antenna 1004. In some embodiments, microchip 1002 is the same as microchip 902. The antenna 1004 being detuning from the 2.45 GHz frequency is accomplished via shortening the antenna length from the optimally tuned free space length of 57 mm. The length of RFID tag 1000, de-tuned from 2.45 GHZ is 37 mm 1006, along one edge as illustrated in FIG. 10. RFID tag 1000 represents a slight variation to RFID tag 900, as the ends (1008, 1010) of the dipole antenna have been tapered to conform to the shape of hub, thus providing a slightly larger antenna with the inner edge potion having a length of approximately 37 mm, and the outer edge having a length a few mm longer, e.g., 2 to 6 mm longer. In some embodiments, the antenna of the RFID tag is a linear dipole antenna and has a minimum length along its longest axis within the range of 34 mm to 38 mm and a maximum length along its longest axis less than 50 mm.

Below is a chart showing the reception results of various RFID test tags with different length antennas when used with a conventional DVD. Results were determined using a 200 mW reader and linearly polarized reader antenna. The results indicate that the RFID tag 900 with a 37 mm inlet length provided the best results during the test; however, the other lengths were also usable for some applications.

| Inlet Length | Clear Hub | Metallized Hub |
| --- | --- | --- |
| 37 mm | Good | Good |
| 32 mm | Good | Very Inconsistent |
| 27 mm | Good | Inconsistent |
| 23 mm | Inconsistent | Inconsistent |
| 18 mm | Very Inconsistent | Very Inconsistent |

For use on both clear and metallized hubs, a tag with a length in the range of 33 mm to 41 mm is preferable, with a length of between 35 and 39 mm having shown better results.

Figure 11:
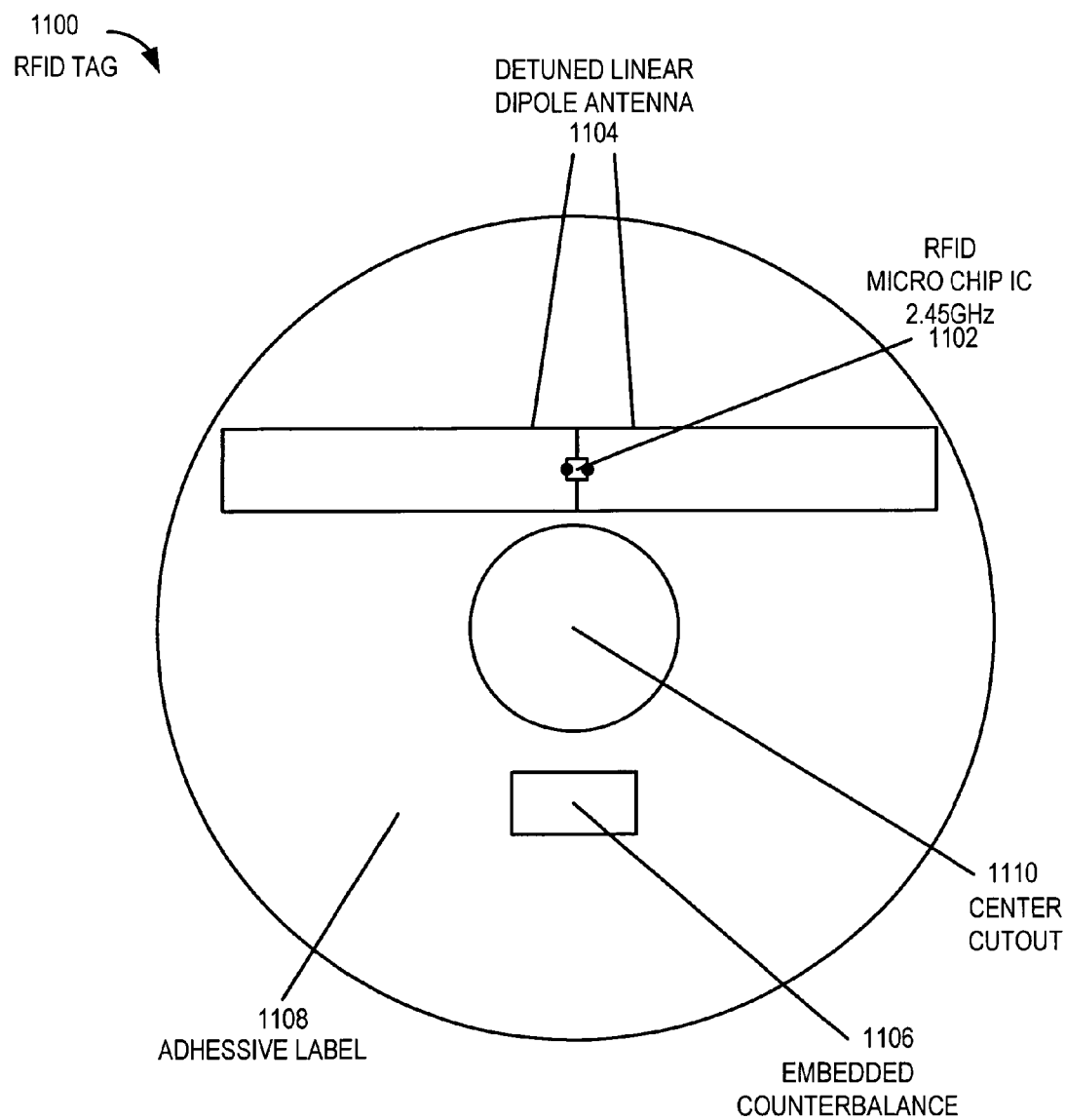
FIG. 11 is a drawing illustrating an exemplary circular shaped RFID tag, implemented in accordance with the present invention, where the circular shaped RFID tag includes an adhesive label, embedded micro-chip, embedded detuned linear dipole antenna, and an embedded counterbalance.

In some embodiments of the present invention, the RFID micro-chip and its de-tuned linear dipole antenna is embedded into a very lightweight and inexpensive pressure sensitive label to be applied to optical storage discs as an aftermarket offering for non-line-of-sight identification purposes. FIG. 11 is a drawing of an exemplary RFID tag 1100, implemented in accordance with the present invention. The tag including the label can be placed on a Disc and secured thereto by adhesive. Exemplary RFID tag 1100 includes a circular adhesive label 1108 with a center cutout 1110, an embedded 2.45 GHz micro-chip IC 1102 and an embedded de-tuned linear dipole antenna 1104, and an embedded counterbalance 1106. Embedded micro-chip 1102 and embedded detuned-linear dipole antenna 1104 may be microchip 900 and detuned linear dipole antenna 904 of FIG. 9.

Figure 12:
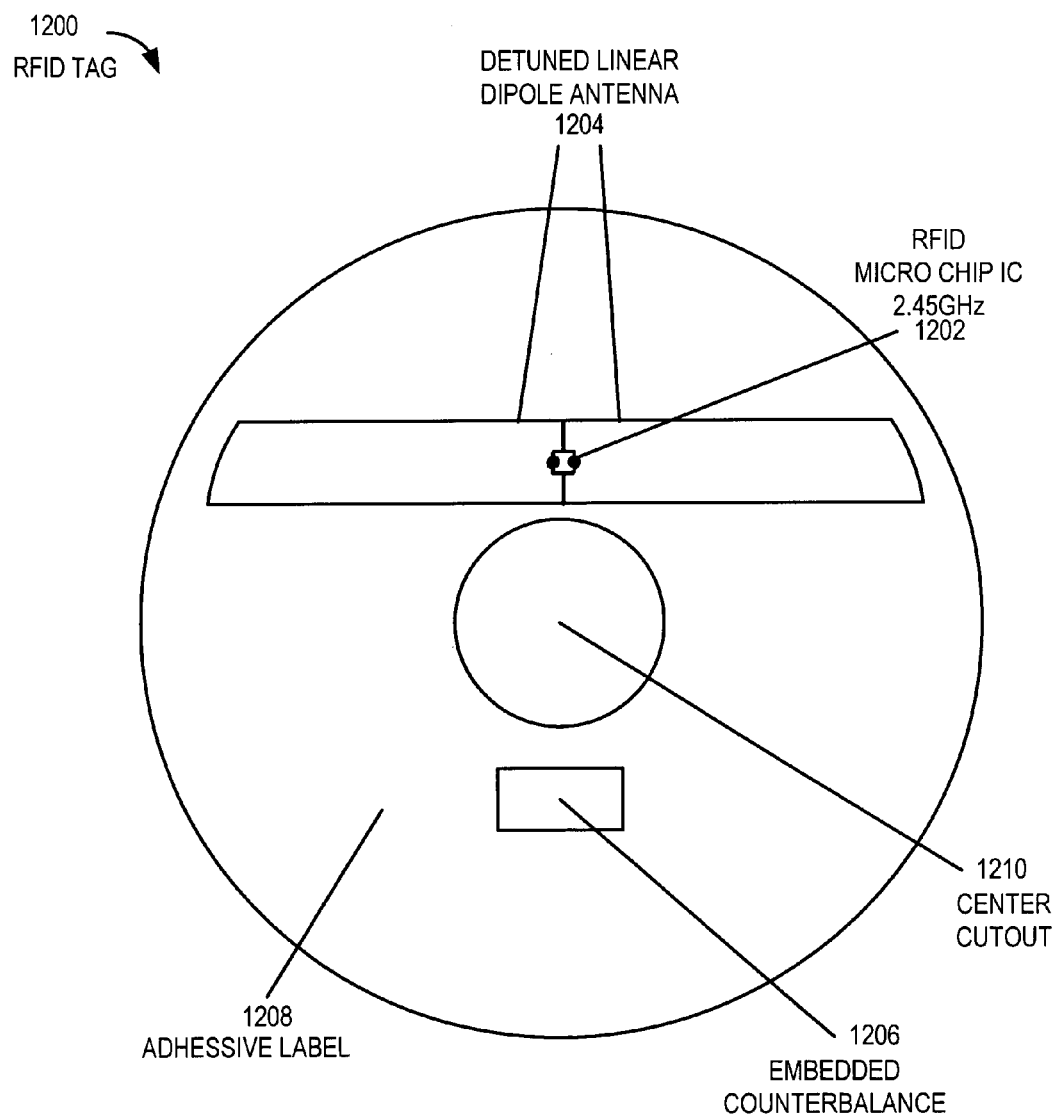
FIG. 12 is a drawing illustrating an exemplary circular shaped RFID tag, implemented in accordance with the present invention, which is a variation of the embodiment of FIG. 11 in which the ends of the detuned linear dipole antenna are tapered to account for hub curvature.

FIG. 12 is a drawing of another exemplary RFID tag 1200, implemented in accordance with the present invention. Exemplary RFID tag 1200 includes a circular adhesive label 1208 with a center cutout 1210, an embedded 2.45 GHz RFID micro-chip IC 1202 and an embedded de-tuned linear dipole antenna 1204, and an embedded counterbalance 1206. Embedded micro-chip 1202 and embedded detuned-linear dipole antenna 1204 may be microchip 1002 and detuned linear dipole antenna 1004 of FIG. 10.

Figure 13A:
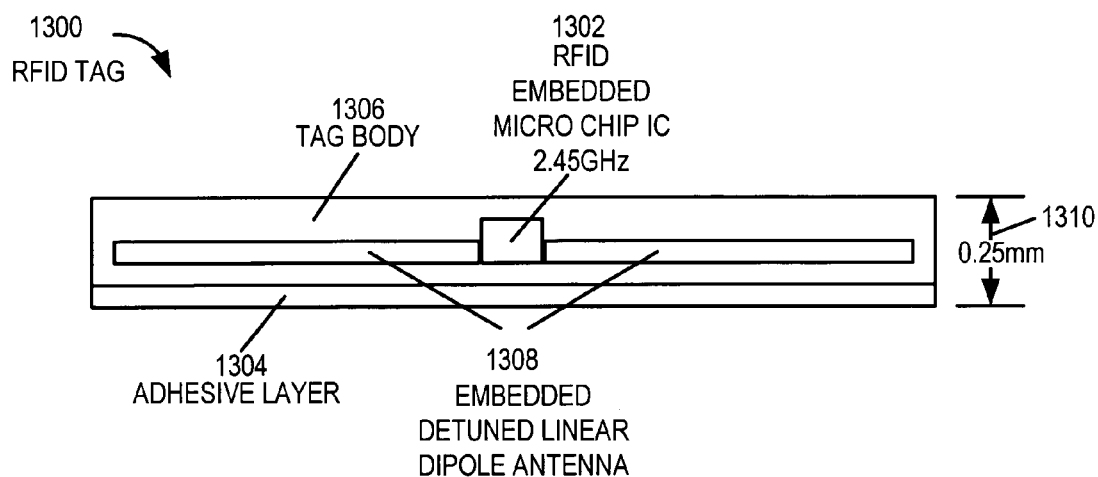
FIG. 13A is a drawing illustrating a side view cross sectional area of some embodiments of RFID tag of FIG. 11 or 12, wherein the cross section slices through the embedded micro-chip and detuned linear dipole antenna.

FIG. 13A is a drawing illustrating a side view cross sectional area of exemplary RFID tag 1300, wherein the cross section slices through the embedded micro-chip and detuned linear dipole antenna. Exemplary RFID tag 1300 may be the exemplary RFID tag 1100 of FIG. 11 or exemplary RFID tag 1200 of FIG. 12. Exemplary RFID tag 1300 includes an embedded 2.45 GHz RFID micro-chip IC 1302, an embedded detuned linear dipole antenna 1308, a tag body 1306, and an adhesive layer 1304. Exemplary RFID tag 1300 has a thickness 1310 of 0.25 mm.

Figure 13B:
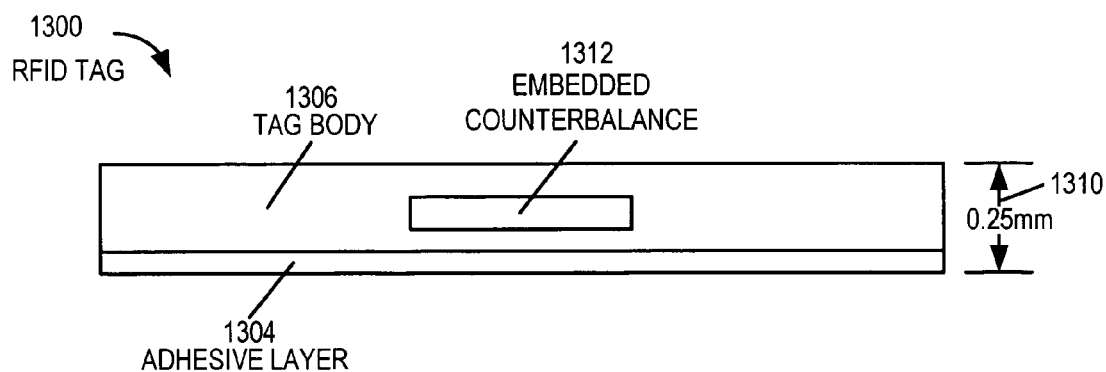
FIG. 13B is a drawing illustrating a side view cross sectional area of some embodiments of the RFID tag of FIG. 11 or 12, wherein the cross section slices through the embedded counterbalance.

FIG. 13B is a drawing illustrating a side view cross sectional area of Exemplary RFID tag 1300, wherein the cross section slices through the embedded counterbalance 1312.

Figure 14A:
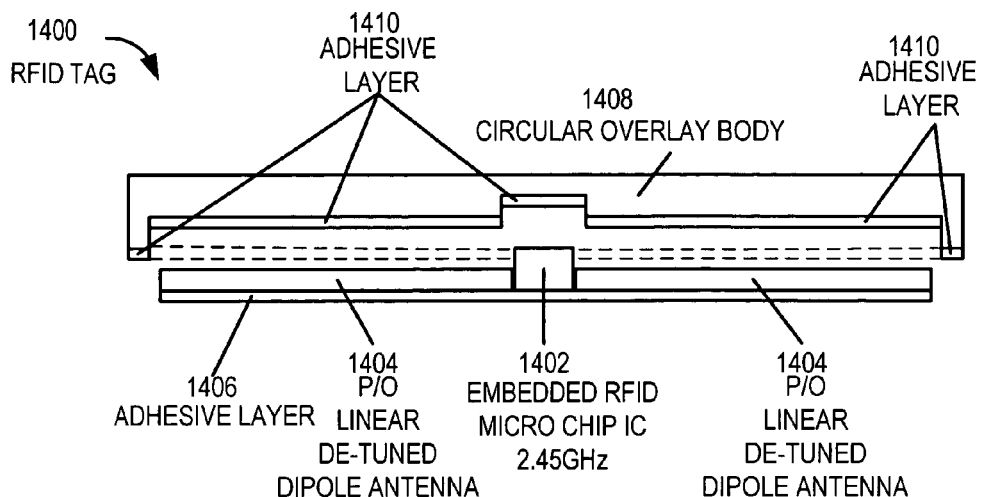
FIG. 14A is a drawing illustrating an exploded side view of a cross sectional area of some embodiments of RFID tag of FIG. 11 or 12, wherein the cross section slices through the embedded micro-chip and detuned linear dipole antenna, and wherein the RF tag includes a micro-chip/antenna portion and a circular overlay body portion.

FIG. 14A is a drawing illustrating an exploded side view of a cross sectional area of exemplary RFID tag 1400, implemented in accordance with the present invention, wherein the cross section slices through the embedded micro-chip and detuned linear dipole antenna, and wherein the RF tag includes a micro-chip/antenna portion and a circular overlay body portion. Exemplary RFID tag 1400 may be the exemplary RFID tag 1100 of FIG. 11 or exemplary RFID tag 1200 of FIG. 12.

Exemplary RFID tag 1400 includes a embedded RFID micro-chip IC 1402, dipole antenna 1404, adhesive layer 1406 for securing the micro-chip IC and dipole antenna 1404 to the disc, a circular overlay body 1408, and an adhesive layer 1410 for securing the circular overlay body to the microchip IC 1402, dipole antenna 1404, and disc.

Figure 14B:
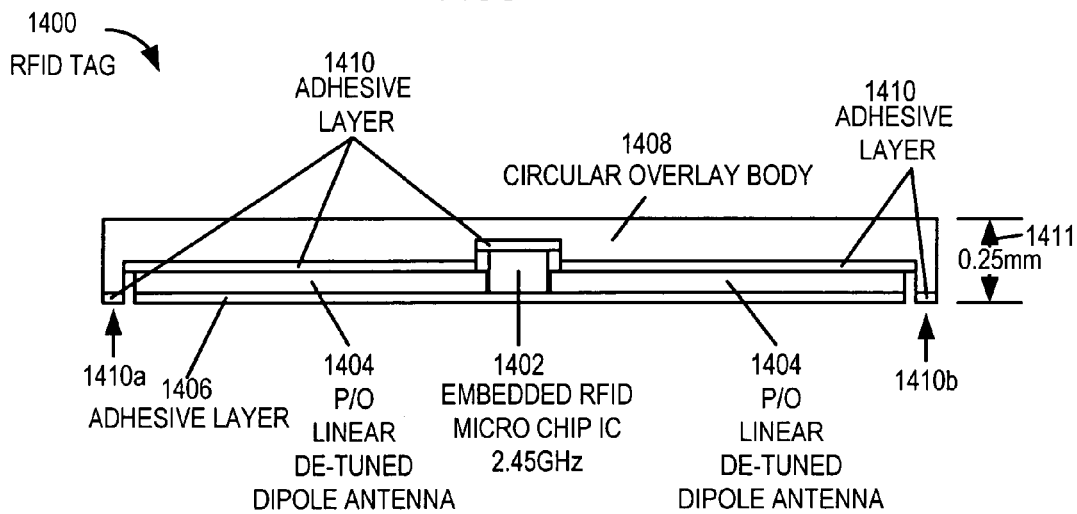
FIG. 14B is drawing illustrating the view of FIG. 14A, except that the micro-chip/antenna portion and a circular overlay body portion has been fit together, as it would appear when installed on a disc.

FIG. 14B is drawing illustrating the view of FIG. 14A, except that the micro-chip/antenna portion and a circular overlay body portion has been fit together, as it would appear when installed on a disc. The width 1411 of the assembled RFID tag is 0.25 mm. In some embodiments, the RFID tag 1400 is supplied to a user in an assembled form as shown in FIG. 14B, with the adhesion portions which are to contact the disc (1406, 1410a, 1410b) being covered, e.g., with a peel off covering such as a wax coated paper.

Figure 14C:
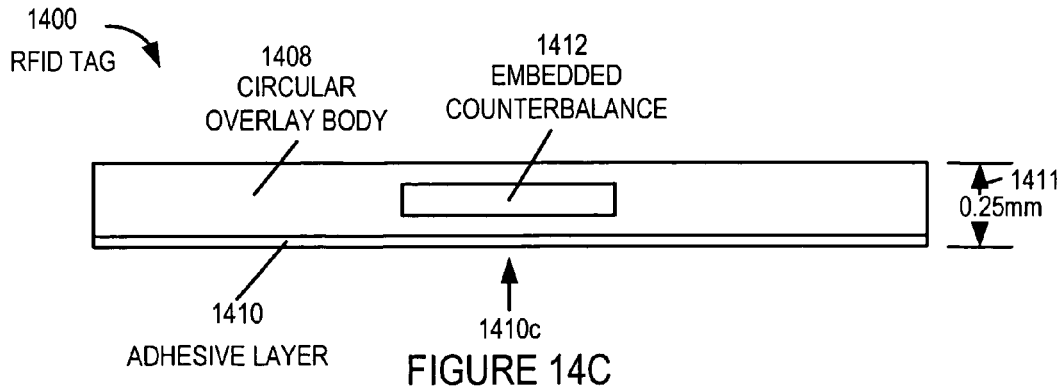
FIG. 14C is a drawing illustrating a side view of a cross sectional area of some embodiments of RFID tag of FIG. 11 or 12, where the cross section slices through the embedded counterbalance.

FIG. 14C is a drawing illustrating a side view of a cross sectional area of RFID tag 1400, where the cross section slices through the embedded counterbalance 1412.

Figure 15A:
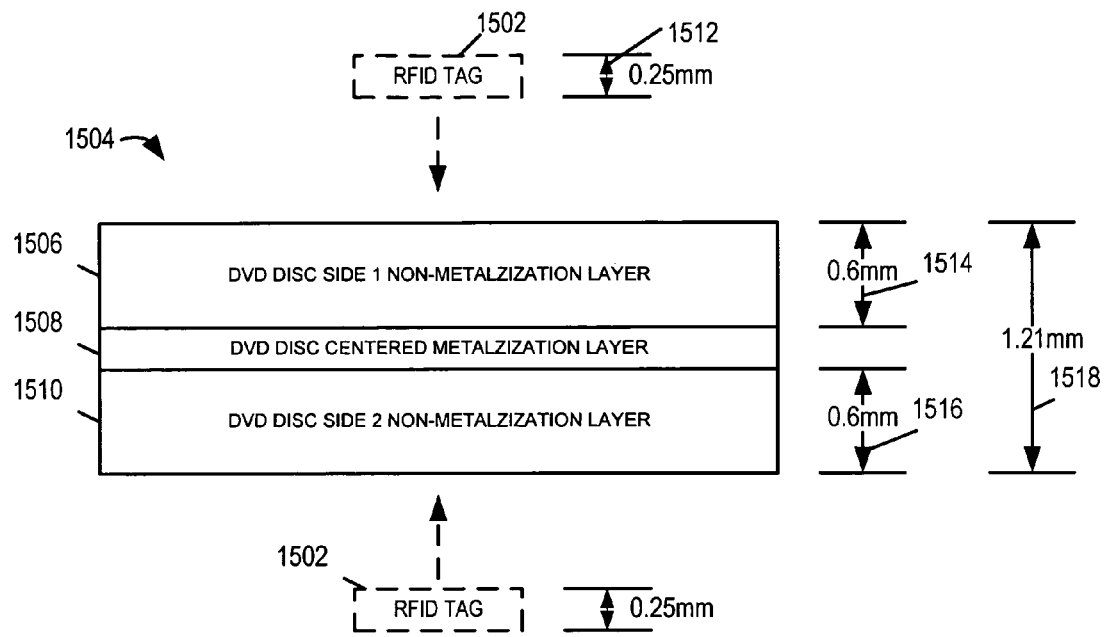
FIG. 15A illustrates typical layers of a DVD and illustrates that an exemplary universal RFID tag, implemented in accordance with the present invention, may be applied to either side of the disc.

FIG. 15A illustrates typical layers of a DVD 1504 and illustrates that an exemplary universal RFID tag 1502, implemented in accordance with the present invention, may be applied to either side of the disc. FIG. 15A includes DVD 1504 including a side 1 non-metalization layer 1506 with a width 1514 of 0.6 mm, a center metallization layer 1508, and a side 2 non-metalization layer 1510 with a width 1516 of 0.6 mm. The overall width 1518 of DVD 1504 is 1.21 mm. Exemplary RFID tag 1502 has a width 1512 of 0.25 mm.

Figure 15B:
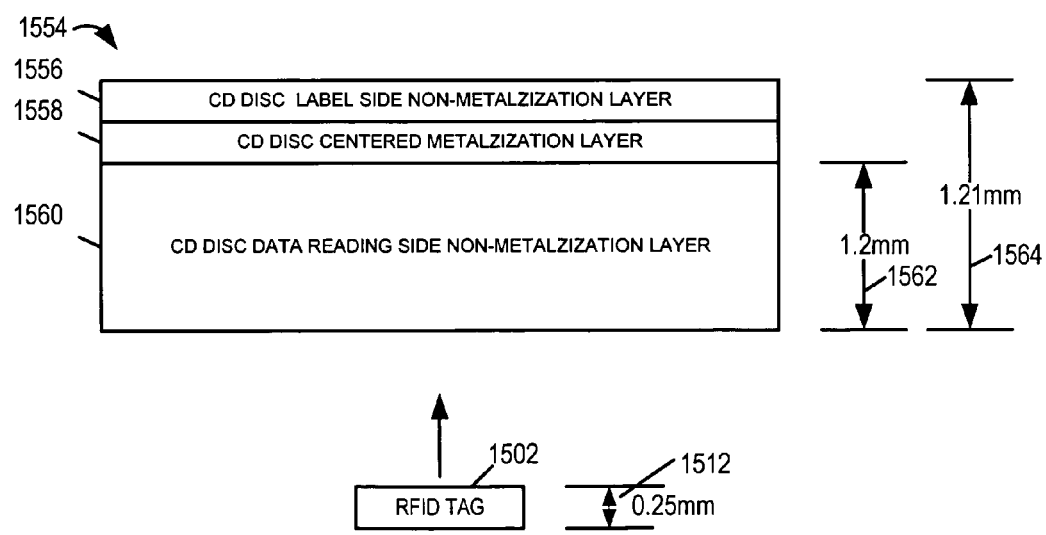
FIG. 15B illustrates typical layers of a CD disc and illustrates that an exemplary universal RFID tag, implemented in accordance with the present invention, is applied to the side furthest away from the metallization layer.

FIG. 15B illustrates typical layers of a CD disc 1554 and illustrates that an exemplary universal RFID tag 1502, implemented in accordance with the present invention, is applied to the side furthest away from the metallization layer. FIG. 15B includes CD 1554 including a label side non-metalization layer 1556, a metallization layer 1558, and a data reading side non-metalization layer 1560 with a width 1562 of 1.2 mm. The overall width 1564 of CD 1554 is 1.21 mm. Exemplary REID tag 1502 has a width 1512 of 0.25 mm.

Figure 16:
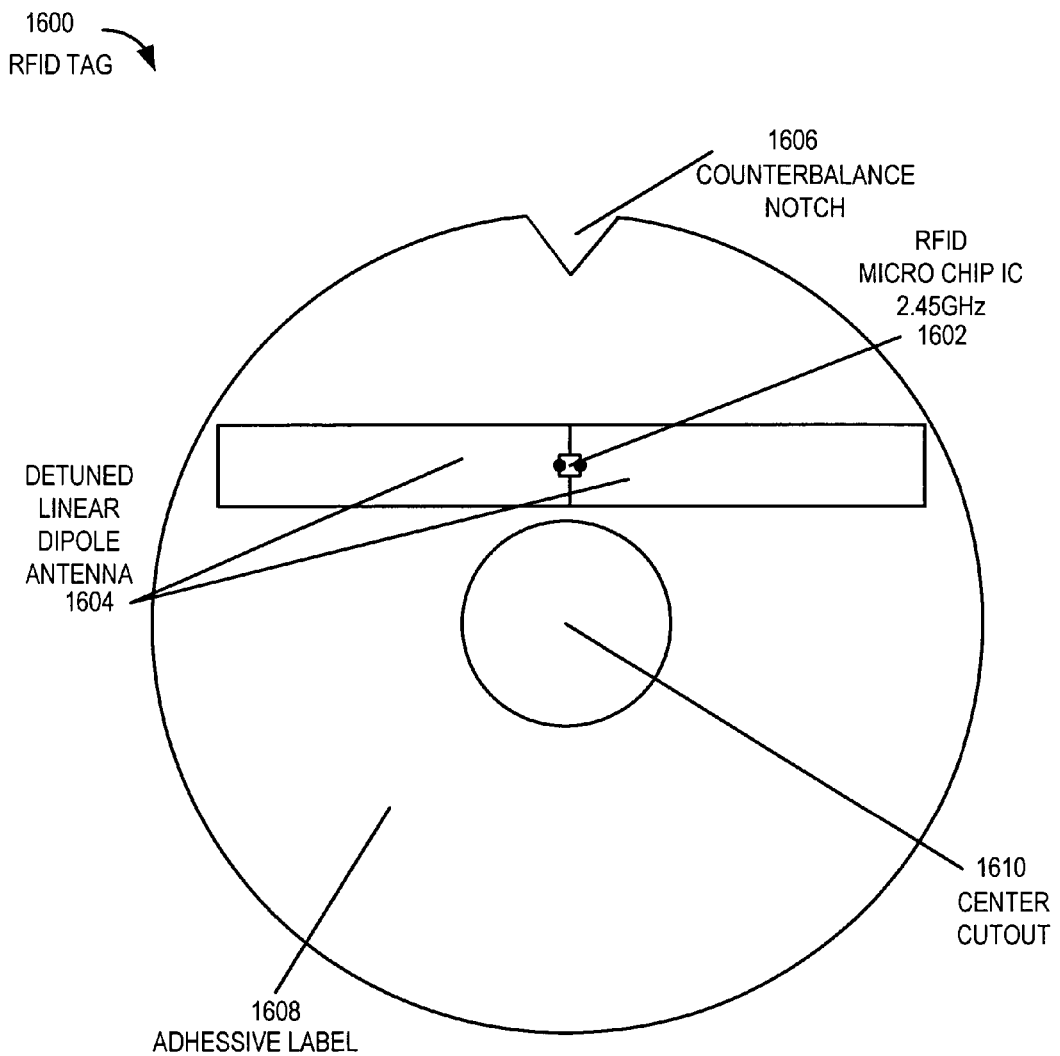
FIG. 16 illustrates an exemplary RFID disc tag, implemented in accordance with the present invention, wherein counterbalance to the added weight of the micro-chip and detuned linear antenna is achieved using a notch in a portion of the tag.

FIG. 16 illustrates an exemplary RFID disc tag 1600, implemented in accordance with the present invention, wherein counterbalance to the added weight of the micro-chip and detuned linear antenna is achieved using a notch 1606 in a portion of the tag. Exemplary RFID tag 1600 includes adhesive label 1608 with a center cutout 1610 and a counterbalance notch 1606, an embedded 2.45 GHz RFID micro-chip IC 1602, and an embedded detuned linear dipole antenna 1604. In some embodiments, multiple counterbalance notches are used. In some embodiments, a counterbalance notch may be fully internal to the adhesive label such that the notch does not alter the outer periphery of the adhesive label from forming a complete circle. Various embodiments of exemplary RFID tags, previously described in accordance with the present invention may use the counterbalance notch feature in place of an added counterbalance weight. In some embodiments, the added weight of the micro-chip IC/antenna and rotational speed of the disc are such that a counterbalance mechanism is not necessary and is omitted from the RFID tag. In some embodiments, the RFID tag is provided with a plurality of punch-out counterbalance cutouts and the user applying the tag selects the best cutout for the particular disc application.

RFID tags of the present invention utilize the metallization in the disc to augment the tag's antenna. The linear RFID antenna, as shown in various exemplary embodiments, is preferred to other shapes such a "V" shape or circular antenna due to cost considerations. The present invention uses a linear dipole antenna not dependent on being radially inward. Its size and weight are so small that attaching it on one side of the hub area should not significantly impact disc operation. Some embodiments of the present invention include a circular adhesive overlayer designed to counterbalance the miniscule weight of the RFID tag.

The present invention can be used with only a very small area of this hub to be free from conductive material (e.g., 10% or more). The modified RFID tag uses metallization in the data area to make the sub-optimal length of dipole antenna readable when placed on a disc with a metallized hub. The present invention uses a straight line linear antenna placed tangentially across a clear hub area that varies in surface area size based on the disc it is applied to.

While the present invention has been described with reference to the particular illustrative embodiments, it is not restricted to those embodiments. It is to be appreciated that those skilled in the art can change or modify the embodiments without departing from the scope and spirit of the invention.

Figure 1:
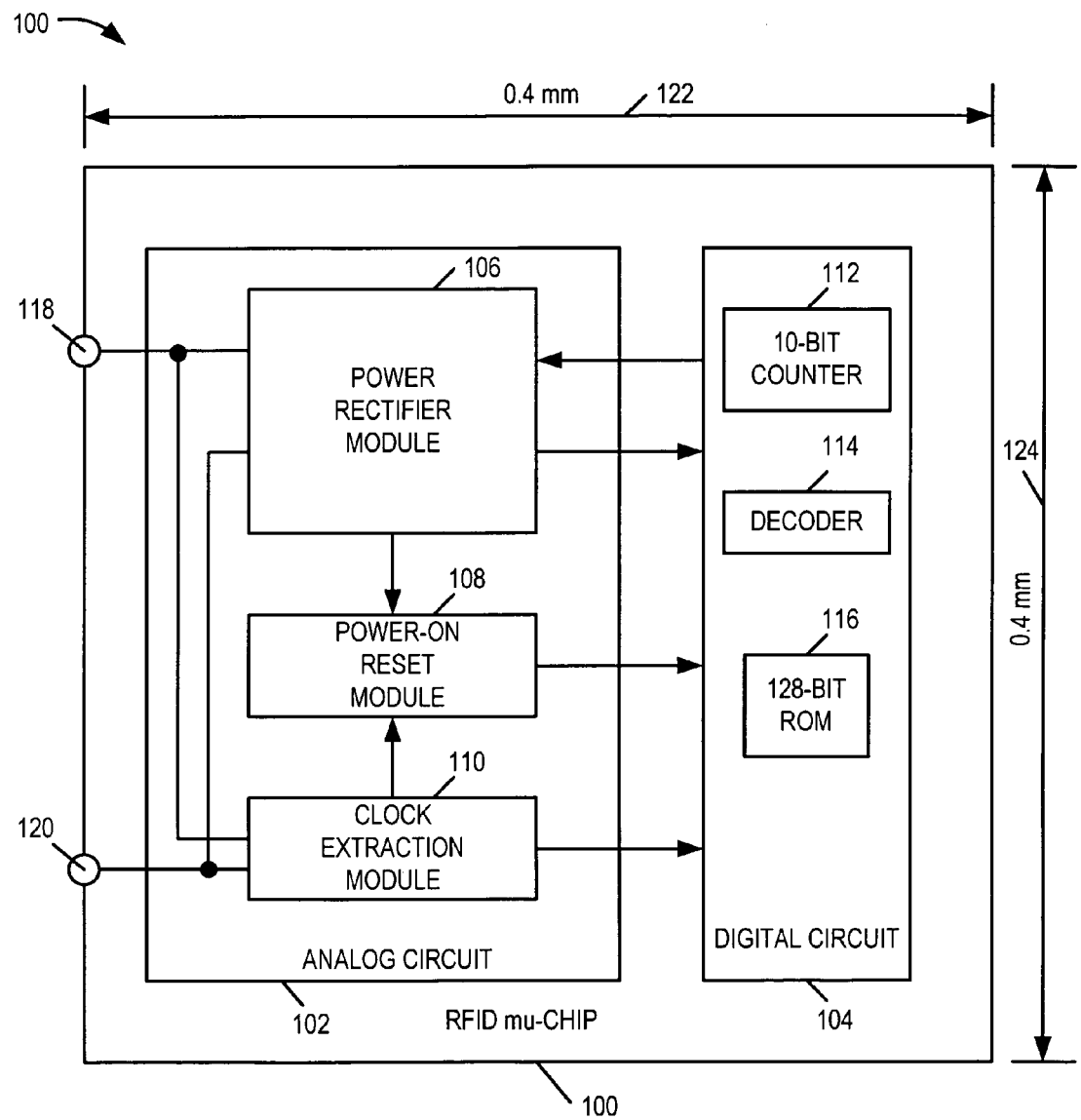
FIG. 1 is a drawing of an exemplary prior art RFID mu-chip block diagram.
Figure 2:
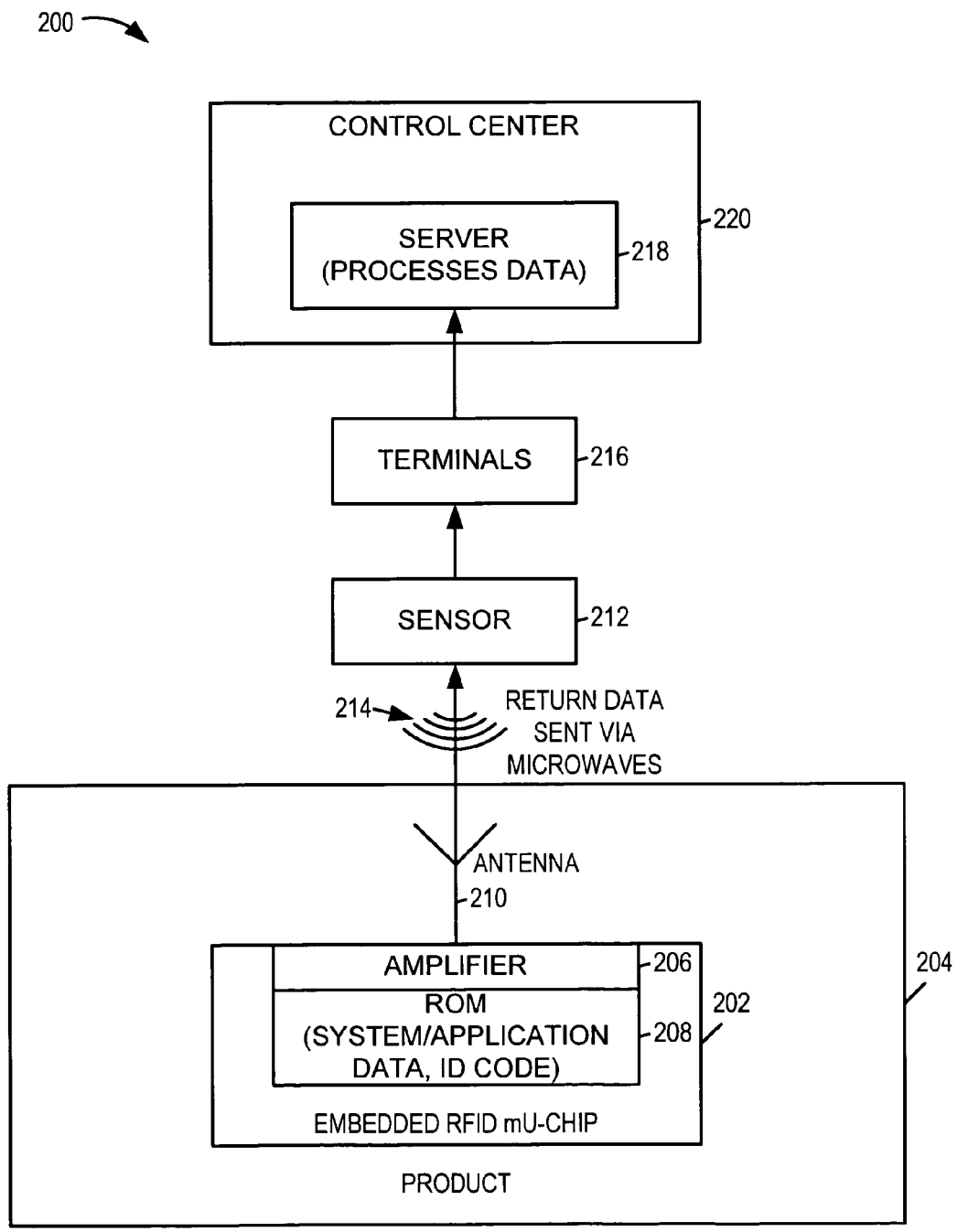
FIG. 2 is a drawing illustrating an RFID mu-chip/antenna, embedded in a product, communicating its ID information to a sensor in an exemplary RFID system.
Figure 3:
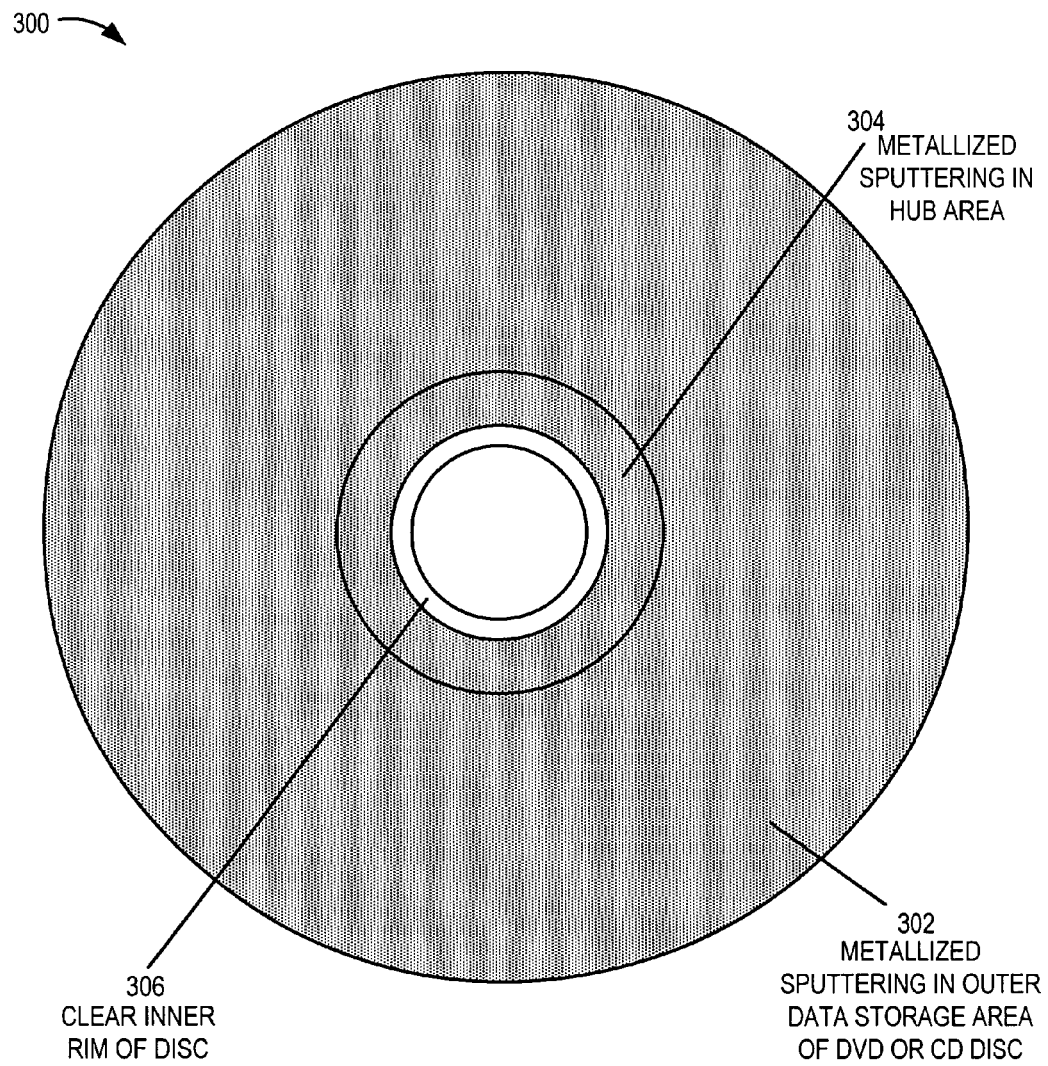
FIG. 3 is a drawing illustrating a typical DVD or CD disc including metallized sputtering the in the hub area.
Figure 4:
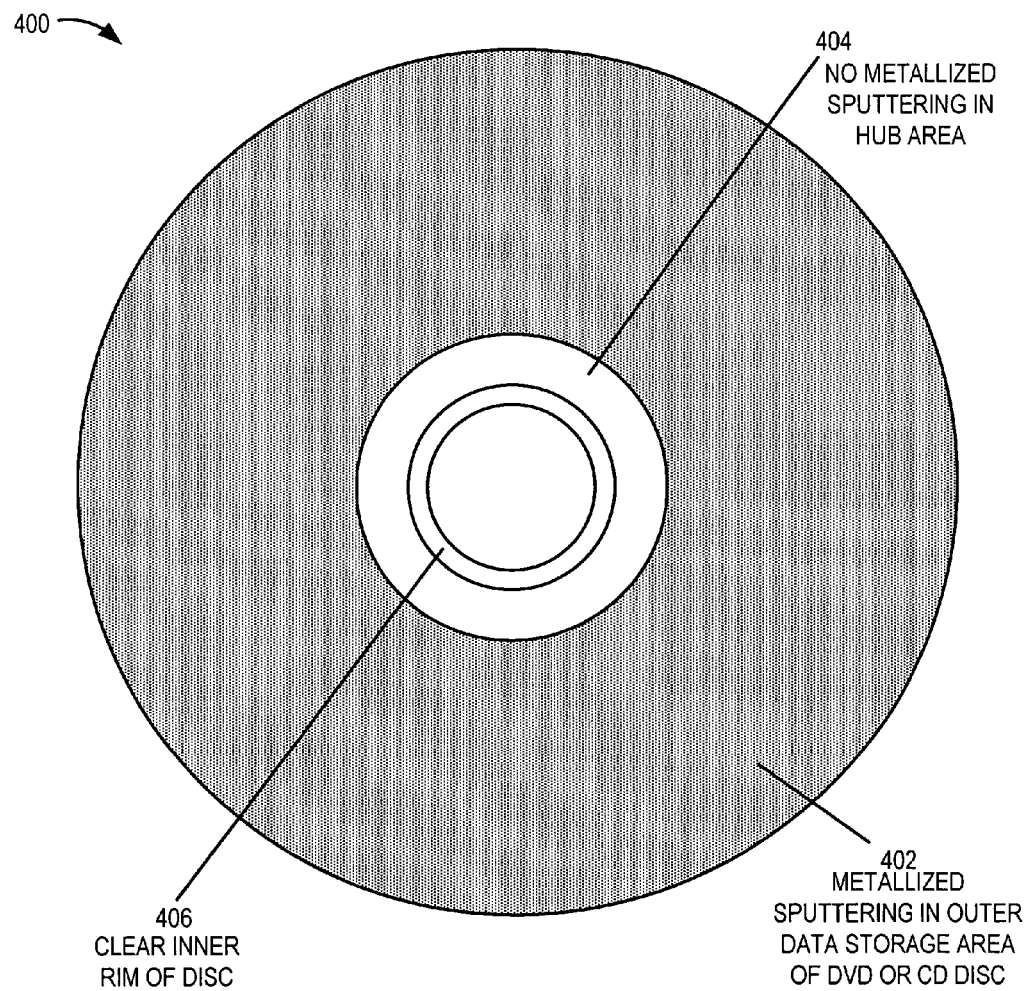
FIG. 4 is a drawing illustrating a typical DVD or CD disc including no metallized sputtering in the hub area.
Figure 5:
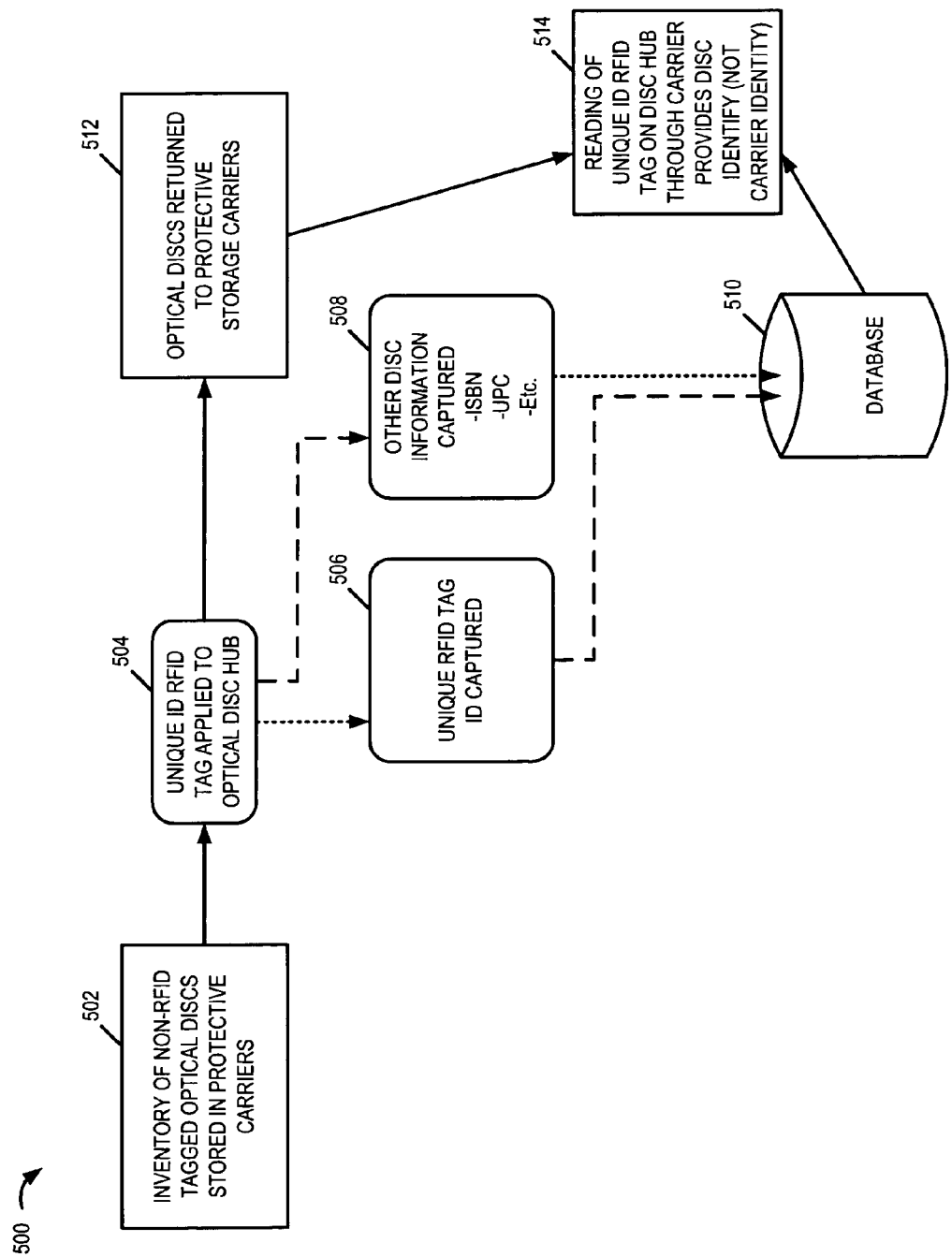
FIG. 5 is a drawing illustrating an exemplary method of implementing and using a universal RFID disc tag in a system in accordance with the present invention.

Referring now to FIG. 5, an exemplary method of implementing a system using universal Disc RFID Tags implemented in accordance with the present invention is shown. In step 502 an inventory of non-RFID tagged optical discs stored in protective carriers is obtained to be tagged. Operation proceeds to step 504, where, for each disc to be tagged, the disc is removed from its protective carrier and a unique RFID tag is applied to the optical disc hub. In accordance with the present invention, the same type of universal RFID tag may be applied to CD and DVD discs hubs, and the discs may include non metallized sputtering hubs and/or metallized sputtering hubs. For example, the installation may involve, removing the backing from a self-sticking circular RFID disc tag, centering the tag around the disc hub, and applying pressure to secure the tag onto the disc hub. For discs, where the metallized sputtering is near the center of the disc, e.g., a typical DVD disc, the tag may be applied to either side. For discs, where the metallized sputtering is close to one of the outer surfaces of the disc, e.g., a typical CD disc, the tag is applied to the opposite side of the disc, e.g., typically the data reading side. Operation proceeds from step 504 to steps 506, 508, and 512. In step 506, the unique RFID tag ID is captured and the captured information sent to a database 510. In some embodiments the capture is performed as discs pass down a conveyer belt. In other embodiments they are manually held and scanned. For example, the newly RFID tagged disc may be placed in the vicinity of a tag reader, which sends a microwave signal to the RFID tag. In accordance with one feature of the present invention, the RFID tag reading of discs is accomplished whether the RFID tag side of the disc faces the reader or whether other side of the disc faces the reader. In accordance with one feature of the present invention, at least a portion of the antenna is located in the clear inner rim of the disc providing a communicating path in either direction. The RFID tag's antenna couples with the metallized sputtering of the disc forming a complex antenna. The received signal powers up the RFID tag. This results in the RFID tag transmitting its unique identification signal, which is subsequently received and decoded by the tag reader; the tag reader forwards identification information to the database. In step 508, other disc information, e.g., ISBN, UPC, etc. is captured and forwarded to the database 510, where the information from step 508 is associated with the information from step 506. Step 508 may include scanning information, automated correlation of information, and/or manual entry of information. For example, a database may already exist, e.g., based on bar codes, associating each disc with a set of information such as title, description, rating, release date, playing time length, format, special features/material included, language options, etc. An operator may check that the title on the optical disc matches the title on the protective carrier, and then scan the bar code on the protective carrier, accessing the set of information associated with the disc. This accessed information may be forwarded to database 510 to be linked with the RFID tag information from step 506. Alternately, or in addition, an operator can manually enter information pertaining to the disc and/or scan information relating to the disc, e.g., scan the label, to be included in database 510 and to be linked to information received from step 506. This process creates a record in database 510 for each disc, which may be accessed in the future based on an RFID read and decode. In step 512, the operator has completed the system initialization associated with a newly RFID tagged disc and returns the disc to its storage carrier. This initialization process is performed for each of the discs to be RFID tagged in the system.

Operation proceeds from step 512 to step 514, for each disc for updating and/or checking of the inventory. For example, if the system is part of library or rental system, when a participating member wishes to check out or return a disc, the disc, while still in its protective case may be placed in the vicinity of an RFID reader, which reads the unique RFID tag on the disc hub through the disc carrier, correlates the read RFID information with information stored in the database, and then updates tracking records, e.g., storing information identifying that a certain member has received/returned a specific disc and including time tag information and optionally sorts discs.

While described in the context of DVDs, the RFID tag of the present invention can be used on a wide variety of current and future discs including HD DVD and Blu-Ray discs.

What is claimed is:

1. A disc for storing information comprising:
   a disc structure including a metallized area, said metallized area including an outer metallized data storage area for storing information;
   a non-metal inner rim area located inside said metallized area;
   a radio frequency linear dipole antenna placed over a portion of said metallized area and over a portion of said non-metal inner ring area, said radio frequency linear dipole antenna being separated from said metallized area by a non-conductive material located between said radio frequency linear dipole antenna and said metallized area;
   a radio frequency identification chip electrically coupled to said radio frequency linear dipole antenna;
   wherein the combination of said linear dipole antenna and said portion of the metallized area overlapped by said linear dipole antenna creates an effective antenna tuned to a predetermined frequency range enabling information from said chip to be transmitted through said effective antenna within said predetermined frequency range associated with said radio frequency identification chip;
   wherein said radio frequency linear dipole antenna has a length that is shorter than a length otherwise required to tune the radio frequency linear dipole antenna to said predetermined frequency range in the absence of antenna interaction with said metallized area; and
   wherein said radio frequency linear dipole antenna is straight along its longest axis, said radio frequency linear dipole antenna having a maximum length along it longest axis within the range of 34 mm to 40 mm.

2. The disc of claim 1, wherein said predetermined frequency range is greater than 2 GHz.

3. The disc of claim 2, wherein said predetermined frequency range is centered on 2.45 GHz.

4. The disc of claim 1, wherein said predetermined frequency range is within the range of 2.25 to 2.75 GHz.

5. The disc of claim 1, wherein said length of said radio frequency linear dipole antenna is at least 25 percent shorter than would be required to tune the radio frequency linear dipole antenna to said predetermined frequency range in the absence of the interaction with said metallized area.

6. The disc of claim 1, wherein said length of said radio frequency linear dipole antenna is at least 30 percent shorter than would be required to tune the radio frequency linear dipole antenna to said predetermined frequency range in the absence of the interaction with said metallized area.

7. The disc of claim 1, wherein said non-conductive material positioned between said radio frequency linear dipole antenna and said metallized area includes:
   at least one non-conductive layer secured to the surface of said metallized area.

8. A disc for storing information comprising;
   a disc structure including a metallized area, said metallized area including an outer metallized data storage area for storing information;
   a non-metal inner rim area located inside said metallized area;
   a radio frequency linear dipole antenna placed over a portion of said metallized area and over a portion of said non-metal inner ring area, said radio frequency linear dipole antenna being separated from said metallized area by a non-conductive material located between said radio frequency linear dipole antenna and said metallized area;
   a radio frequency identification chip electrically coupled to said radio frequency linear dipole antenna;
   wherein said non-conductive material positioned between said antenna and said metallized area includes:
   at least one non-conductive layer secured to the surface of said metallized area; and
   wherein said metallized area includes a metallized hub area located inside of said outer metallized data storage area, said portion of said metallized area overlapped by said radio frequency linear dipole antenna including a portion of said metallized hub area but not said outer metallized data storage area.

9. The disc of claim 8, wherein said radio frequency linear dipole antenna has a minimum length along it longest axis within the range of 34 mm to 38 mm and a maximum length along its longest axis less than 50 mm.

10. The disc of claim 9, wherein said radio frequency linear dipole antenna has curved ends along its longest axis, with the curve of the ends extending from the end point corresponding to the point of the antenna's maximum length to an antenna end point corresponding to the minimum antenna length along the antenna's longest axis.

11. The disc of claim 9, wherein said antenna and said radio frequency identification chip are both less than 0.3 mm thick.

12. The disc of claim 9, wherein said non-conductive layer is less than 0.7 mm thick.

13. A disc for storing information comprising:
   a disc structure including a metallized area, said metallized area including an outer metallized data storage area for storage information;
   a non-metal inner rim area located inside said metallized area;
   a radio frequency linear dipole antenna placed over a portion of said metallized area and over a portion of said non-metal inner ring area, said radio frequency linear dipole antenna being separated from said metallized area by a non-conductive material located between said radio frequency linear dipole antenna and said metallized area;
   a radio frequency identification chip electrically coupled to said radio frequency linear dipole antenna;
   a balancing material used to balance said disc, said balancing material adding weight to a portion of the disc where the identification chip is not located to counterbalance the weight of said identification chip;
   wherein said balancing material is part of a label, said label including at least one of a hole and a notch in the vicinity of the radio frequency identification chip so that the distribution of label material serves to counterbalance to the weight of said chip.

14. The disc of claim 8, wherein a label covers said radio frequency identification chip and said radio frequency linear dipole antenna.

15. The disc of claim 8, wherein a portion of said label is used as said balancing material.

16. The disc of claim 8, wherein said disc is one of a DVD a CD, a Blu-Ray disc, and a HD DVD.

17. A radio frequency identification device for use on a disc which includes an annular disc structure including a metallized area, wherein said metallized area includes an outer metallized data storage area for storing information and a non-metal inner rim area located inside said metallized area the radio frequency identification device comprising:
   a radio frequency linear dipole antenna placed over a portion of said metallized area and over a portion of said non-metal inner ring area, said radio frequency linear dipole antenna being separated from said metallized area by a non-conductive material positioned between said radio frequency linear dipole antenna and said metallized area; and
   a radio frequency identification chip electrically coupled to said radio frequency linear dipole antenna;
   wherein the combination of said radio frequency linear dipole antenna and said metallized area overlapped by said radio frequency linear dipole antenna creates an effective antenna tuned to a predetermined frequency range enabling information from said chip to be transmitted through said effective antenna within said predetermined frequency range associated with said radio frequency identification chip;
   wherein said radio frequency linear dipole antenna has a length that is shorter than a length otherwise required to tune the radio frequency linear dipole antenna to said predetermined frequency range in the absence of antenna interaction with said metallization layer; and
   wherein said radio frequency linear dipole antenna is straight along its longest axis, said radio frequency linear dipole antenna having a maximum length along it longest axis within the range of 34 mm to 40 mm.

18. A radio frequency identification device for use on a disc which includes an annular disc structure including a metallized area, wherein said metallized area includes an outer metallized data storage area for storing information and a non-metal inner rim area located inside said metallized area the radio frequency identification device comprising:
   a radio frequency linear dipole antenna placed over a portion of said metallized area and over a portion of said non-metal inner ring area, said radio frequency linear dipole antenna being separated from said metallized area by a non-conductive material positioned between said radio frequency linear dipole antenna and said metallized area;
   a radio frequency identification chip electrically coupled to said radio frequency linear dipole antenna; and
   wherein said non-conductive material positioned between said radio frequency linear dipole antenna and said metallized area includes at least one non-conductive layer secured to the surface of said metallized area, wherein said metallized area includes a metallized hub area located inside of said outer metallized data storage area, said portion of said metallized area overlapped by said radio frequency linear dipole antenna including a portion of said metallized hub area but not said outer metallized data storage area.

19. A radio frequency identification device for use on a disc which includes an annular disc structure including a metallized area, wherein said metallized area includes an outer metallized data storage area for storing information and a non-metal inner rim area located inside said metallized area the radio frequency identification device comprising:
   a radio frequency linear dipole antenna placed over a portion of said metallized area and over a portion of said non-metal inner ring area, said radio frequency linear dipole antenna being separated from said metallized area by a non-conductive material positioned between said radio frequency linear dipole antenna and said metallized area
   a radio frequency identification chip electrically coupled to said radio frequency linear dipole antenna; and
   wherein said radio frequency linear dipole antenna has a minimum length along its longest axis within the range of 34 mm to 38 mm and a maximum length along its longest axis Less than 50 mm.

20. The device of claim 19,
   wherein said radio frequency linear dipole antenna and said radio frequency identification chip are both less than 0.3 mm thick and wherein said non-conductive layer is less than 0.7 mm thick.

21. The device of claim 19, further comprising:
balancing material used to balance said disc, said balancing material adding weight to a portion of the disc where the radio frequency identification chip is not located to counterbalance the weight of said radio frequency identification chip.

22. The device of claim 21, wherein said balancing material is part of a label, said label including at least one of a hole and a notch in the vicinity of the radio frequency identification chip so that the distribution of label material serves to counterbalance to the weight of said chip.

23. The device of claim 21, wherein a label covers said radio identification chip and wherein a portion of said label is used as said balancing material.

* * * * *